(12) United States Patent
Tasic et al.

(10) Patent No.: US 9,048,928 B2
(45) Date of Patent: Jun. 2, 2015

(54) EXPANDABLE TRANSCEIVERS AND RECEIVERS

(71) Applicant: QUALCOMM Incorporated, San Diego, CA (US)

(72) Inventors: Aleksandar Miodrag Tasic, San Diego, CA (US); Chiewcharn Narathong, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 213 days.

(21) Appl. No.: 13/675,917

(22) Filed: Nov. 13, 2012

(65) Prior Publication Data

US 2014/0134959 A1     May 15, 2014

(51) Int. Cl.
*H04B 1/38* (2006.01)
*H04B 1/16* (2006.01)
*H04B 1/18* (2006.01)
*H04B 1/40* (2006.01)

(52) U.S. Cl.
CPC ... *H04B 1/40* (2013.01); *H04B 1/18* (2013.01)

(58) Field of Classification Search
None
See application file for complete search history.

(56) References Cited

U.S. PATENT DOCUMENTS

| | | | |
|---|---|---|---|
| 6,838,933 B2 | 1/2005 | Goyette et al. | |
| 7,245,655 B1 | 7/2007 | Javor et al. | |
| 7,327,993 B2 | 2/2008 | Khlat | |
| 7,715,836 B2 | 5/2010 | Vassiliou et al. | |
| 2004/0066230 A1* | 4/2004 | Goyette et al. | 330/51 |
| 2004/0152437 A1 | 8/2004 | Behzad | |
| 2006/0281426 A1* | 12/2006 | Galan | 455/188.1 |
| 2010/0040184 A1* | 2/2010 | Haralabidis et al. | 375/373 |
| 2011/0217945 A1* | 9/2011 | Uehara et al. | 455/341 |
| 2012/0121043 A1 | 5/2012 | Wambacq | |

FOREIGN PATENT DOCUMENTS

WO     2012112618 A1     8/2012

OTHER PUBLICATIONS

International Search Report and Written Opinion—PCT/US2013/069751—ISA/EPO—Apr. 7, 2014.

* cited by examiner

*Primary Examiner* — Ping Hsieh
*Assistant Examiner* — James Yang
(74) *Attorney, Agent, or Firm* — Ramin Mobarhan

(57) ABSTRACT

Expandable transceivers and receivers support operation on multiple frequency bands and multiple carriers. In an exemplary design, an apparatus (e.g., a wireless device, an integrated circuit (IC) chip, or circuit module) includes a low noise amplifier (LNA) and interface circuit. The LNA resides on an IC chip and includes a first/on-chip output and a second/off-chip output. The interface circuit also resides on the IC chip, is coupled to the second output of the LNA, and provides an amplified RF signal outside of the IC chip. The apparatus may further include a buffer, load circuit, and downconverter circuit. The buffer resides on the IC chip, is coupled to the first output of the LNA, and receives a second amplified RF signal from outside of the IC chip. The load circuit is coupled to the first output of the LNA. The downconverter circuit is coupled to the load circuit.

20 Claims, 17 Drawing Sheets

EXPANDABLE TRANSCEIVERS AND RECEIVERS

BACKGROUND

I. Field

The present disclosure relates generally to electronics, and more specifically to receivers and transmitters.

II. Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a radio frequency (RF) carrier signal with data to obtain a modulated RF signal, amplify the modulated RF signal to obtain a transmit RF signal having the proper output power level, and transmit the transmit RF signal via an antenna to a base station. For data reception, the receiver may obtain a received RF signal via the antenna and may amplify and process the received RF signal to recover data sent by the base station.

A wireless device may support communication on multiple frequency bands and/or multiple radio technologies. The wireless device may also support carrier aggregation, which is simultaneous operation on multiple carriers. A carrier may refer to a range of frequencies used for communication and may be associated with certain characteristics. For example, a carrier may be associated with system and/or control information describing operation on the carrier. A carrier may also be referred to as a component carrier (CC), a frequency channel, a cell, etc. It is desirable to efficiently support communication by the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Expandable transceivers and receivers that can flexibly support operation on multiple frequency bands, multiple carriers, multiple radio technologies, and/or multiple antennas are disclosed herein. The expandable transceivers and receivers may be used for various types of electronic devices such as wireless communication devices.

Figure 1:
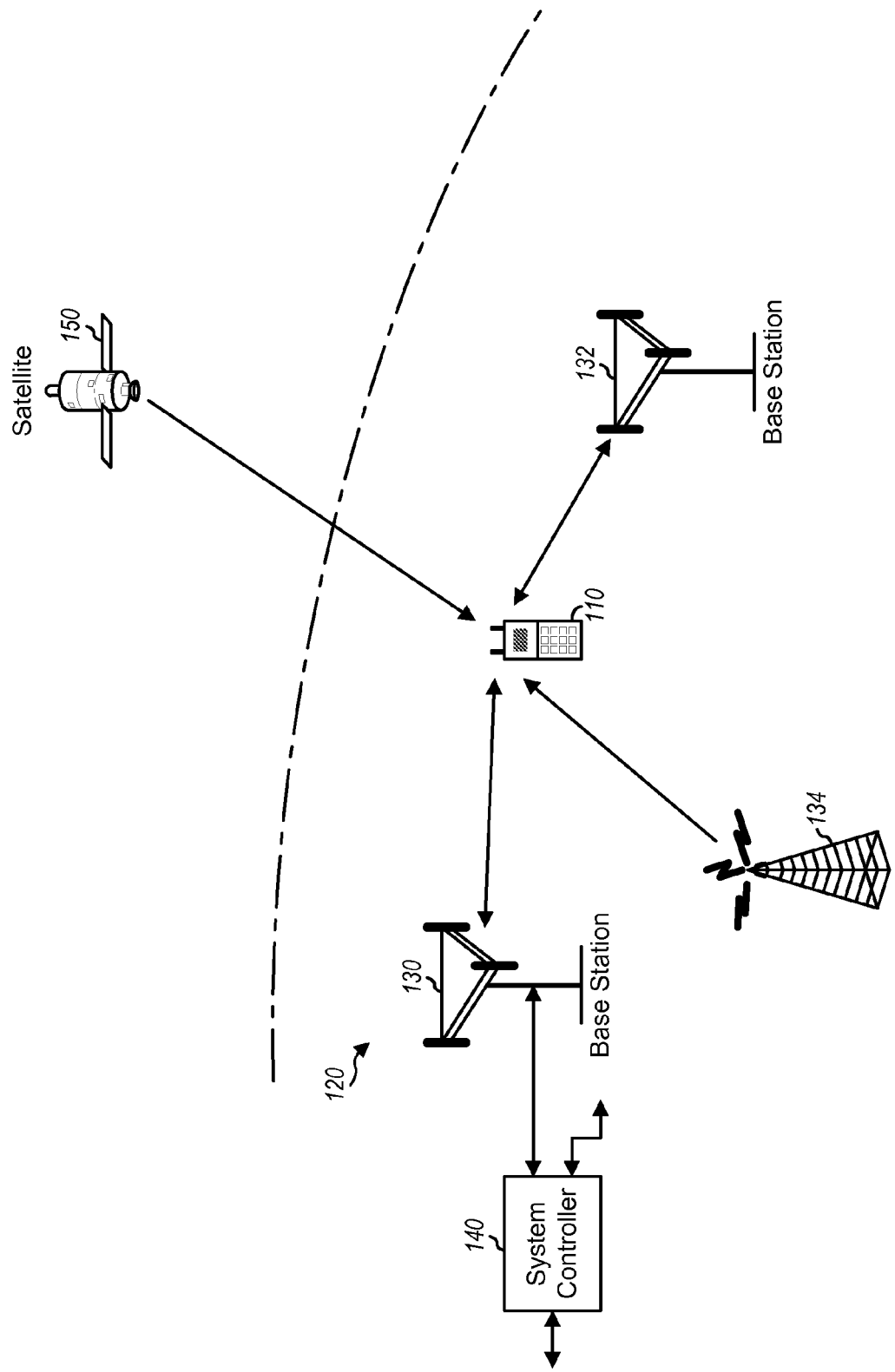
FIG. 1 shows a wireless device communicating with a wireless system.

FIG. 1 shows a wireless device 110 communicating with a wireless communication system 120. Wireless system 120 may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1X, Evolution-Data Optimized (EVDO), Time Division Synchronous CDMA (TD-SCDMA), or some other version of CDMA. For simplicity, FIG. 1 shows wireless system 120 including two base stations 130 and 132 and one system controller 140. In general, a wireless system may include any number of base stations and any set of network entities.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120. Wireless device 110 may also receive signals from broadcast stations (e.g., a broadcast station 134), signals from satellites (e.g., a satellite 150) in one or more global navigation satellite systems (GNSS), etc. Wireless device 110 may support one or more radio technologies for wireless communication such as LTE, WCDMA, CDMA 1X, EVDO, TD-SCDMA, GSM, 802.11, etc.

Wireless device 110 may support carrier aggregation, which is operation on multiple carriers. Carrier aggregation may also be referred to as multi-carrier operation. Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 960 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz and may include one or more carriers. Each carrier may cover up to 20 MHz in LTE. LTE Release 11 supports 35 bands, which are referred to as LTE/UMTS bands and are listed in 3GPP TS 36.101. Wireless device 110 may be configured with up to five carriers in one or two bands in LTE Release 11.

In general, carrier aggregation (CA) may be categorized into two types—intra-band CA and inter-band CA. Intra-band CA refers to operation on multiple carriers within the same band. Inter-band CA refers to operation on multiple carriers in different bands.

Figure 2:
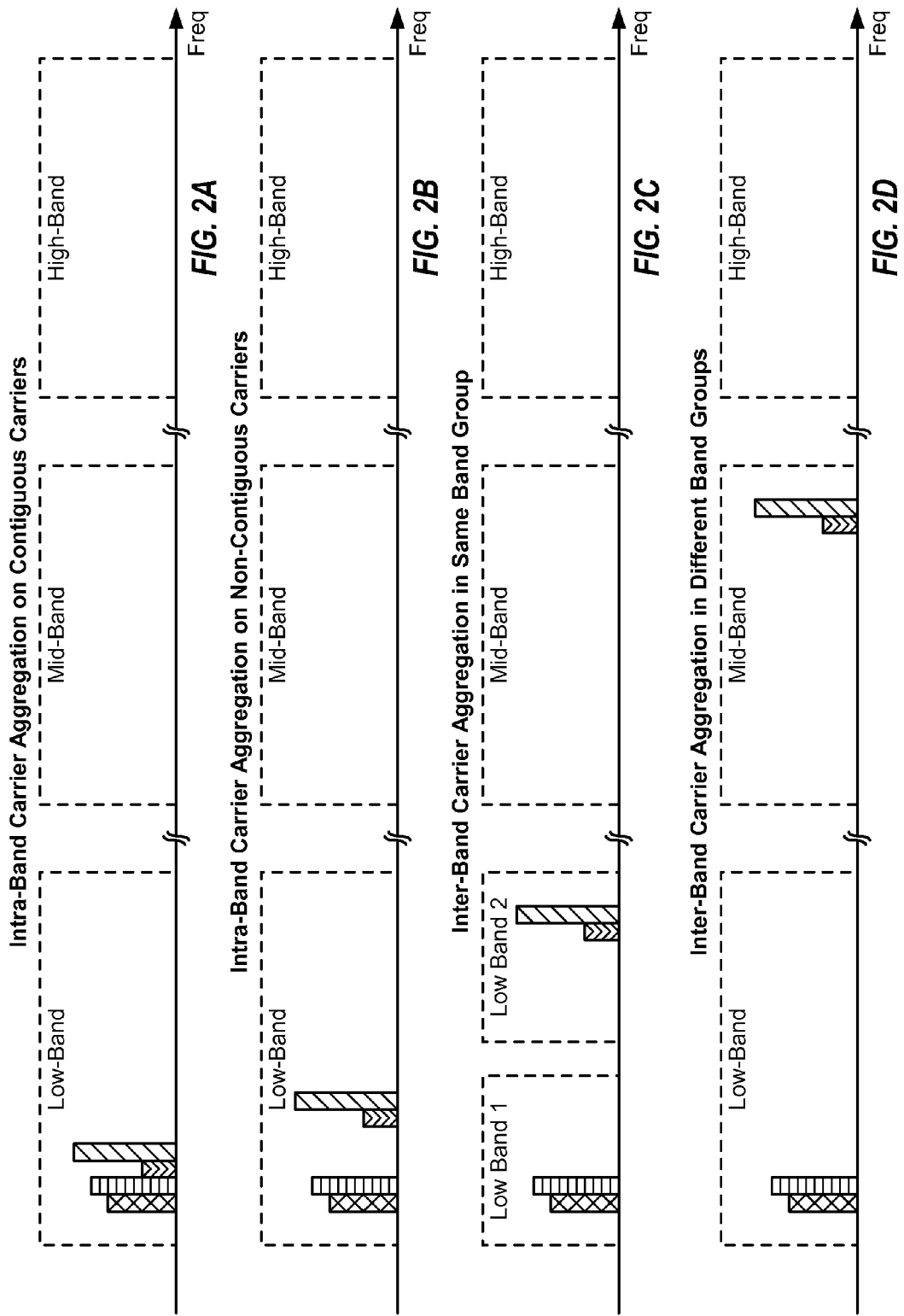
FIGS. 2A to 2D show four examples of carrier aggregation (CA).

FIG. 2A shows an example of contiguous intra-band CA. In the example shown in FIG. 2A, wireless device 110 is configured with four contiguous carriers in one band in low-band. Wireless device 110 may send and/or receive transmissions on the four contiguous carriers within the same band.

FIG. 2B shows an example of non-contiguous intra-band CA. In the example shown in FIG. 2B, wireless device 110 is configured with four non-contiguous carriers in one band in low-band. The carriers may be separated by 5 MHz, 10 MHz, or some other amount. Wireless device 110 may send and/or receive transmissions on the four non-contiguous carriers within the same band.

FIG. 2C shows an example of inter-band CA in the same band group. In the example shown in FIG. 2C, wireless device 110 is configured with four carriers in two bands in low-band. Wireless device 110 may send and/or receive transmissions on the four carriers in different bands in the same band group.

FIG. 2D shows an example of inter-band CA in different band groups. In the example shown in FIG. 2D, wireless device 110 is configured with four carriers in two bands in different band groups, which include two carriers in one band in low-band and two carriers in another band in mid-band. Wireless device 110 may send and/or receive transmissions on the four carriers in different bands in different band groups.

FIGS. 2A to 2D show four examples of carrier aggregation. Carrier aggregation may also be supported for other combinations of bands and band groups.

Figure 3:
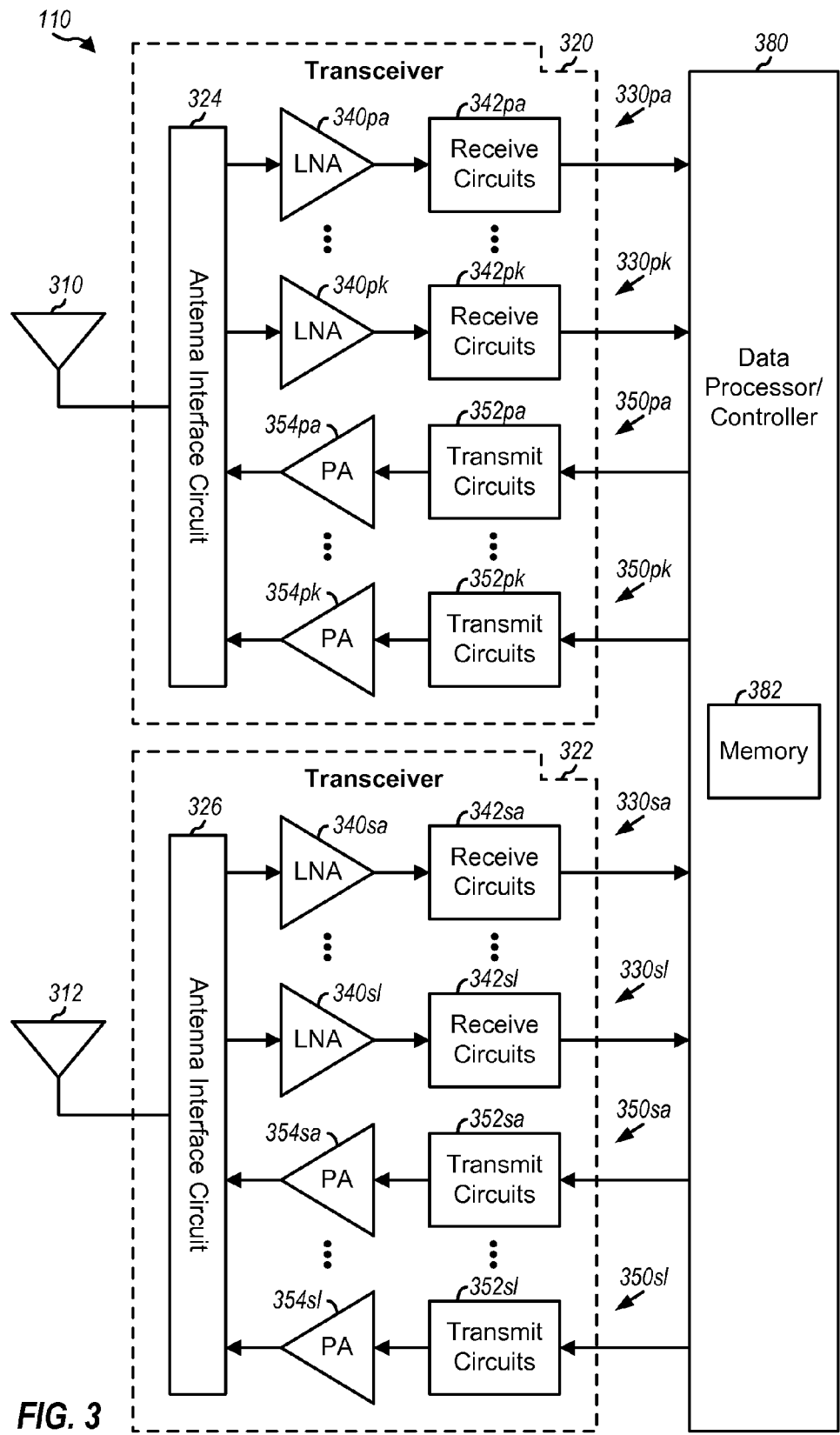
FIG. 3 shows a block diagram of the wireless device in FIG. 1.

FIG. 3 shows a block diagram of an exemplary design of wireless device 110 in FIG. 1. In this exemplary design, wireless device 110 includes a transceiver 320 coupled to a primary antenna 310, a transceiver 322 coupled to a secondary antenna 312, and a data processor/controller 380. Transceiver 320 includes multiple (K) receivers 330pa to 330pk and multiple (K) transmitters 350pa to 350pk to support multiple frequency bands, multiple radio technologies, carrier aggregation, etc. Transceiver 322 includes L receivers 330sa to 330sl and L transmitters 350sa to 350sl to support multiple frequency bands, multiple radio technologies, carrier aggregation, receive diversity, multiple-input multiple-output (MIMO) transmission from multiple transmit antennas to multiple receive antennas, etc.

In the exemplary design shown in FIG. 3, each receiver 330 includes an LNA 340 and receive circuits 342. For data reception, antenna 310 receives signals from base stations and/or other transmitter stations and provides a received RF signal, which is routed through an antenna interface circuit 324 and presented as an input RF signal to a selected receiver. Antenna interface circuit 324 may include switches, duplexers, transmit filters, receive filters, matching circuits, etc. The description below assumes that receiver 330pa is the selected receiver. Within receiver 330pa, an LNA 340pa amplifies the input RF signal and provides an output RF signal. Receive circuits 342pa downconvert the output RF signal from RF to baseband, amplify and filter the downconverted signal, and provide an analog input signal to data processor 380. Receive circuits 342pa may include mixers, filters, amplifiers, matching circuits, an oscillator, a local oscillator (LO) generator, a phase locked loop (PLL), etc. Each remaining receiver 330 in transceivers 320 and 322 may operate in similar manner as receiver 330pa.

In the exemplary design shown in FIG. 3, each transmitter 350 includes transmit circuits 352 and a power amplifier (PA) 354. For data transmission, data processor 380 processes (e.g., encodes and modulates) data to be transmitted and provides an analog output signal to a selected transmitter. The description below assumes that transmitter 350pa is the selected transmitter. Within transmitter 350pa, transmit circuits 352pa amplify, filter, and upconvert the analog output signal from baseband to RF and provide a modulated RF signal. Transmit circuits 352pa may include amplifiers, filters, mixers, matching circuits, an oscillator, an LO generator, a PLL, etc. A PA 354pa receives and amplifies the modulated RF signal and provides a transmit RF signal having the proper output power level. The transmit RF signal is routed through antenna interface circuit 324 and transmitted via antenna 310. Each remaining transmitter 350 in transceivers 320 and 322 may operate in similar manner as transmitter 350pa.

FIG. 3 shows an exemplary design of receiver 330 and transmitter 350. A receiver and a transmitter may also include other circuits not shown in FIG. 3, such as filters, matching circuits, etc. All or a portion of transceivers 320 and 322 may be implemented on one or more analog integrated circuits (ICs), RF ICs (RFICs), mixed-signal ICs, etc. For example, LNAs 340 and receive circuits 342 within transceivers 320 and 322 may be implemented on multiple IC chips, as described below. The circuits in transceivers 320 and 322 may also be implemented in other manners.

Data processor/controller 380 may perform various functions for wireless device 110. For example, data processor 380 may perform processing for data being received via receivers 330 and data being transmitted via transmitters 350. Controller 380 may control the operation of the various circuits within transceivers 320 and 322. A memory 382 may store program codes and data for data processor/controller 380. Data processor/controller 380 may be implemented on one or more application specific integrated circuits (ASICs) and/or other ICs.

Wireless device 110 may support CA and may (i) receive multiple downlink signals transmitted by one or more cells on multiple downlink carriers at different frequencies and/or (ii) transmit multiple uplink signals to one or more cells on multiple uplink carriers. Transmitters and receivers to support CA may be implemented on a single IC chip. However, it may be difficult or not possible to meet isolation requirements between the transmitters and receivers in certain transmit (TX) and receive (RX) bands due to limited pin-to-pin isolation on the IC chip.

For example, in the inter-CA mode, the isolation requirement between some TX and RX bands (e.g., UMTS Bands 4 and 17) may be 100 decibels (dB), which may be difficult or not possible to achieve since pin-to-pin isolation is worse than the isolation requirement. On-chip transmit filtering may improve pin-to-pin RX/TX isolation but (i) may degrade transmitter performance and (ii) may not reduce other RX/TX coupling mechanisms on the same IC chip. Furthermore, spurious signals from multiple PLLs and LO generators operating simultaneously on the same IC chip may degrade transmitter performance. Sensitivity of a receiver may also be degraded due to poor spurious and isolation performance.

In an aspect of the present disclosure, expandable transceivers and receivers implemented on multiple IC chips may be used to support CA and mitigate the problems described above. Transmitters and receivers on the multiple IC chips may be selected for use such that interference between these transmitters and receivers may be mitigated. As an example, for inter-band CA, a transmitter and a receiver on one IC chip may be used for communication on one band, and another transmitter and another receiver on another IC chip may be used for communication on another band. This may mitigate spurious and isolation problems encountered in the single-chip design.

Figure 4:
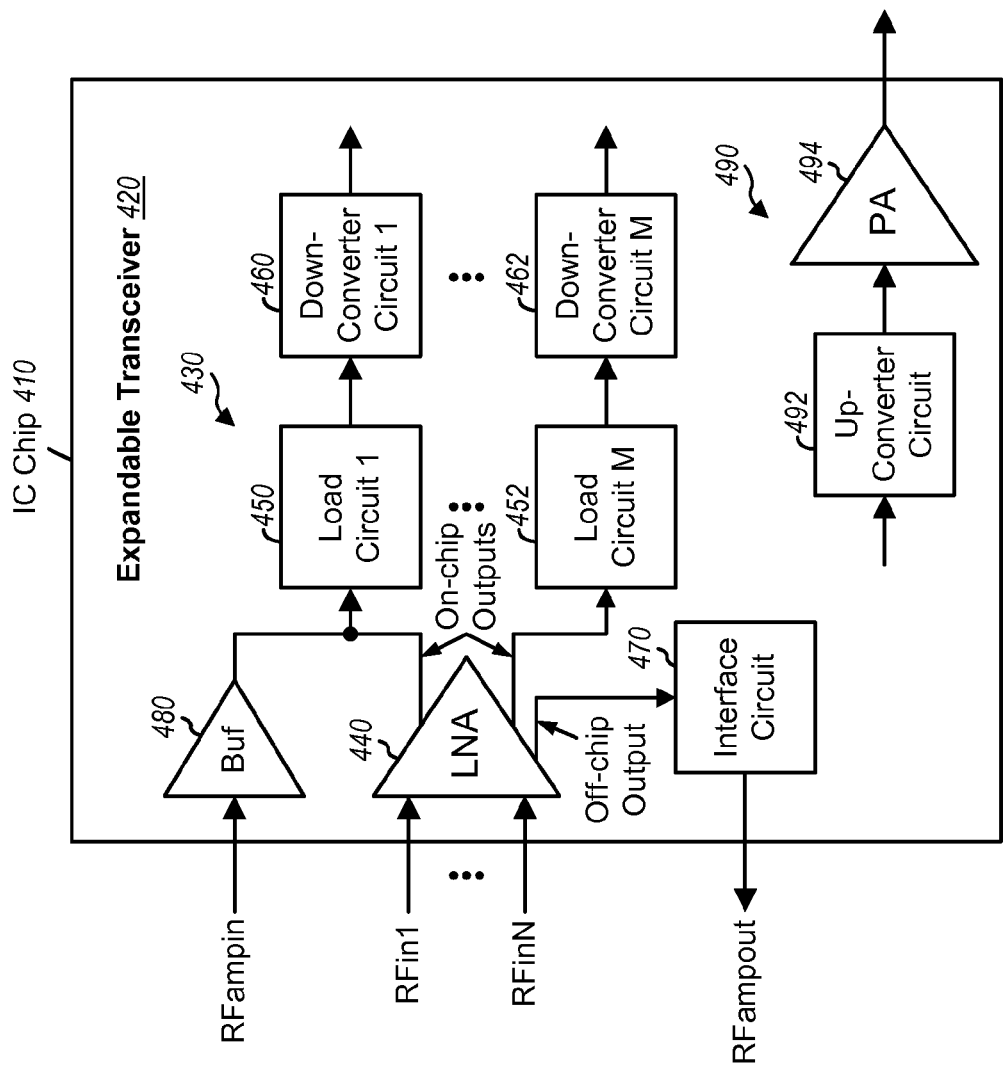
FIG. 4 shows an expandable transceiver implemented on an integrated circuit (IC) chip.

FIG. 4 shows a block diagram of an exemplary design of an expandable transceiver 420 implemented on an IC chip 410. Transceiver 420 comprises an expandable (M,1) receiver 430 and a transmitter 490. In general, a (M,L) receiver includes (i) M "on-chip" outputs coupled to downconverters on the same IC chip and (ii) L "off-chip" outputs coupled to one or more other receivers off-chip. In the description herein, "on-chip" refers to an intended destination of a signal within an IC chip, and "off-chip" refers to an intended destination of a signal outside an IC chip. An "on-chip output" is an output whose signal is intended for a circuit within an IC chip, and an "off-chip output" is an output whose signal is intended for a circuit outside of an IC chip. An on-chip output and an off-chip output may both be physically located on an IC chip but the signals from these outputs have different intended destinations.

In the exemplary design shown in FIG. 4, receiver 430 includes an LNA 440 having N inputs (e.g., for N different bands), M on-chip outputs for M sets of carriers that may be received simultaneously, and one off-chip output, where in general N≥1 and M≥1. LNA 440 may be used for any of LNAs 330 in FIG. 3. The N inputs of LNA 440 receive up to N input RF signals, RFin1 to RFinN. The M on-chip outputs of LNA 440 are coupled to M load circuits 450 to 452, which are further coupled to M downconverters 460 to 462, respectively. The M downconverters 460 to 462 receive output RF signals from the M load circuits 450 to 452, respectively. Each downconverter may include two mixers to perform quadrature downconversion of its output RF signal from RF to baseband or an intermediate frequency. An interface circuit 470 has an input coupled to the off-chip output of LNA 440 and an output providing an amplified RF signal, RFampout, to an external receiver on another IC chip (not shown in FIG. 4). A buffer 480 has its input receiving an amplified RF signal, RFampin, from another receiver on another IC chip and its output coupled to a first on-chip output of LNA 440.

In the exemplary design shown in FIG. 4, transmitter 490 includes an upconverter circuit 492 coupled to a PA 494. Upconverter circuit 492 may include two mixers to perform quadrature upconversion of an output baseband signal from baseband to RF. PA 494 is coupled to the output of upconverter 492. PA 494 receives and amplifies an modulated RF signal from upconverter circuit 492 and provides a transmit RF signal.

FIG. 4 shows an exemplary design of expandable receiver 430 and transmitter 490, which may also be implemented in other manners. In another exemplary design, expandable receiver 430 may include (i) no interface circuit 470 to drive any external receiver or (ii) more than one interface circuit 470 to drive more than one external receiver. In yet another exemplary design, expandable receiver 430 may include (i) no buffer 480 to receive amplified RF signal from any external receiver or (ii) more than one buffer 480 to receive amplified RF signals from more than one external receiver.

Figure 5:
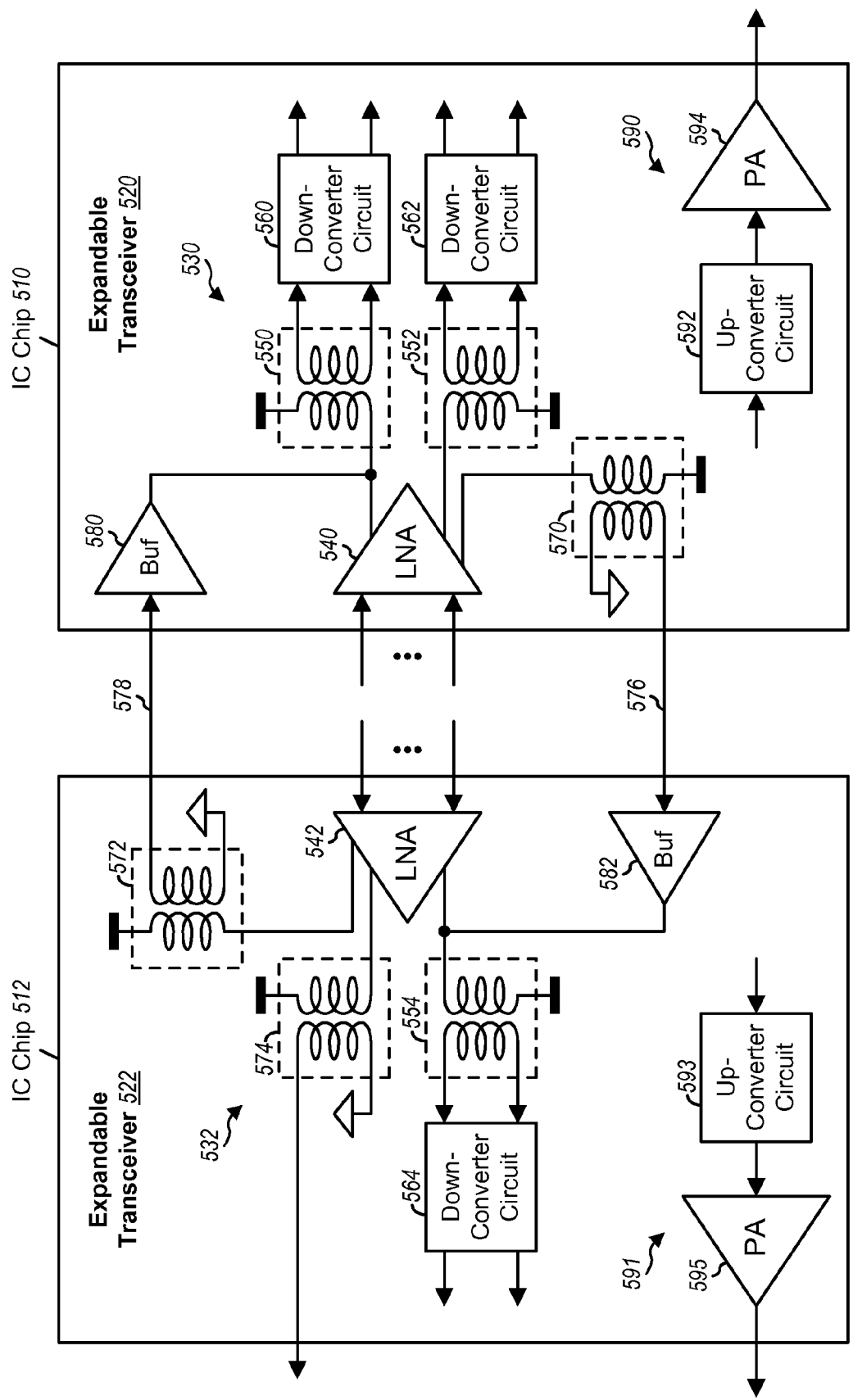
FIG. 5 shows expandable transceivers implemented on two IC chips.

FIG. 5 shows a block diagram of an exemplary design of two expandable transceivers 520 and 522 implemented on two IC chips 510 and 512, respectively. Transceiver 520 comprises (i) an expandable (2,1) receiver 530 having two on-chip outputs and one off-chip output and (ii) a transmitter 590. Transceiver 522 comprises (i) an expandable (1,2) receiver 532 having one on-chip output and two off-chip outputs and (ii) a transmitter 591.

In the exemplary design shown in FIG. 5, receiver 530 includes an LNA 540 having N inputs (e.g., for N different bands), two on-chip outputs for two sets of carriers that may be received simultaneously, and one off-chip output, where N≥1. LNA 540 may be used for any of LNAs 330 in FIG. 3. The N inputs of LNA 540 receive up to N input RF signals. The two on-chip outputs of LNA 540 are coupled to two load circuits 550 and 552, which are further coupled to two downconverters 560 and 562, respectively. In the exemplary design shown in FIG. 5, each load circuit includes a transformer comprising a primary coil and a secondary coil. The two transformers for load circuits 550 and 552 have their primary coils coupled to the two on-chip outputs of LNA 540 and their secondary coils coupled to two downconverters 560 to 562. The other end of each primary coil is coupled to a power supply, VDD. Load circuits 550 and 552 may also be implemented in other manners. For example, a load circuit may include an inductor and possibly a capacitor coupled between an on-chip output of an LNA and the power supply. Downconverters 560 and 562 receive differential output RF signals from load circuits 550 and 552, respectively. Each downconverter may include two mixers to perform quadrature downconversion of its differential output RF signal from RF to baseband or an intermediate frequency.

An interface circuit 570 has an input coupled to the off-chip output of LNA 540 and an output providing an amplified RF signal to an external receiver 532 on another IC chip 512. In the exemplary design shown in FIG. 5, interface circuit 570 comprises a transformer having its primary coil coupled to the off-chip output of LNA 540 and its secondary coil providing the amplified RF signal. In another exemplary design, interface circuit 570 may comprise a capacitor coupled between the input and output of interface circuit 570. Interface circuit 570 may also be implemented with other circuits. A buffer 580 has its input receiving an amplified RF signal from external receiver 532 on another IC chip 512 and its output coupled to the first on-chip output of LNA 540. The primary coil of transformer 550 is thus coupled to both the first on-chip output of LNA 540 and the output of buffer 580.

In the exemplary design shown in FIG. 5, receiver 532 includes an LNA 542 having K inputs (e.g., for K different bands), one on-chip output, and two off-chip outputs, where K≥1. LNA 542 may be used for any of LNAs 330 in FIG. 3. The K inputs of LNA 542 receive up to K input RF signals. The on-chip output of LNA 542 is coupled to a load circuit 554, which is further coupled to a downconverter 564. In the exemplary design shown in FIG. 5, load circuit 554 includes a transformer comprising a primary coil coupled to the on-chip output of LNA 542 and a secondary coil coupled to downconverter 564. Load circuit 554 may also be implemented in other manners. Downconverter 564 receives a differential output RF signal from load circuit 554 and performs quadrature downconversion of the differential output RF signal.

Two interface circuits 572 and 574 are coupled to the two off-chip outputs of LNA 542. In the exemplary design shown in FIG. 5, each interface circuit comprises a transformer having its primary coil coupled to a respective off-chip output of LNA 542 and its secondary coil providing an amplified RF signal. A buffer 582 has its input receiving the amplified RF signal from external receiver 530 on another IC chip 510 and its output coupled to the on-chip output of LNA 542.

In the exemplary design shown in FIG. 5, the output of interface circuit 570 on IC chip 510 is coupled to the input of buffer 582 on another IC chip 512 via a signal line 576. The output of interface circuit 572 within IC chip 512 is coupled to the input of buffer 580 on another IC chip 510 via a signal line 578. The output of interface circuit 574 on IC chip 512 may be coupled to the input of another buffer on another IC chip. Signal lines 576 and 578 may be designed to provide good input match for IC chips 510 and 512 and may have a particular characteristic impedance (50 Ohm).

In the exemplary design shown in FIG. 5, transmitter 590 includes an upconverter circuit 592 and a PA 594 on IC chip 510. Transmitter 591 includes an upconverter circuit 593 and a PA 595 on IC chip 512. Each transmitter may also include other circuits.

Figure 6A:
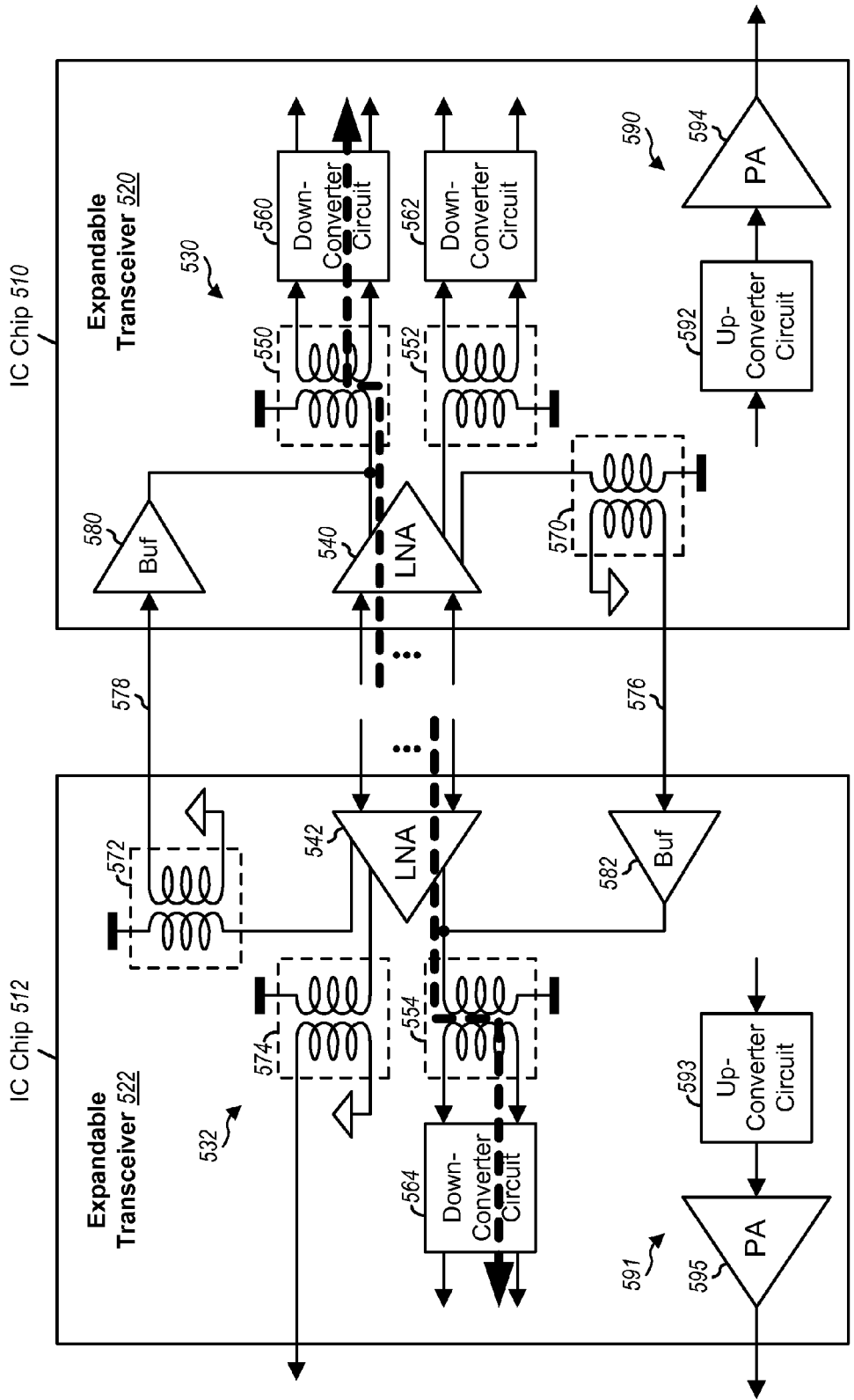
FIGS. 6A and 6B show two modes of operation of the transceivers in FIG. 5.

FIG. 6A shows operation of receivers 530 and 532 in a first operating mode to support two bands. In this example, LNA 540 on IC chip 510 provides a first output RF signal for a first band to load circuit 550, which provides a first differential output RF signal to downconverter circuit 560. LNA 542 on IC chip 512 provides a second output RF signal for a second band to load circuit 554, which provides a second differential output RF signal to downconverter circuit 564. No RF signals are passed between receiver 530 on IC chip 510 and receiver 532 on IC chip 512.

Figure 6B:
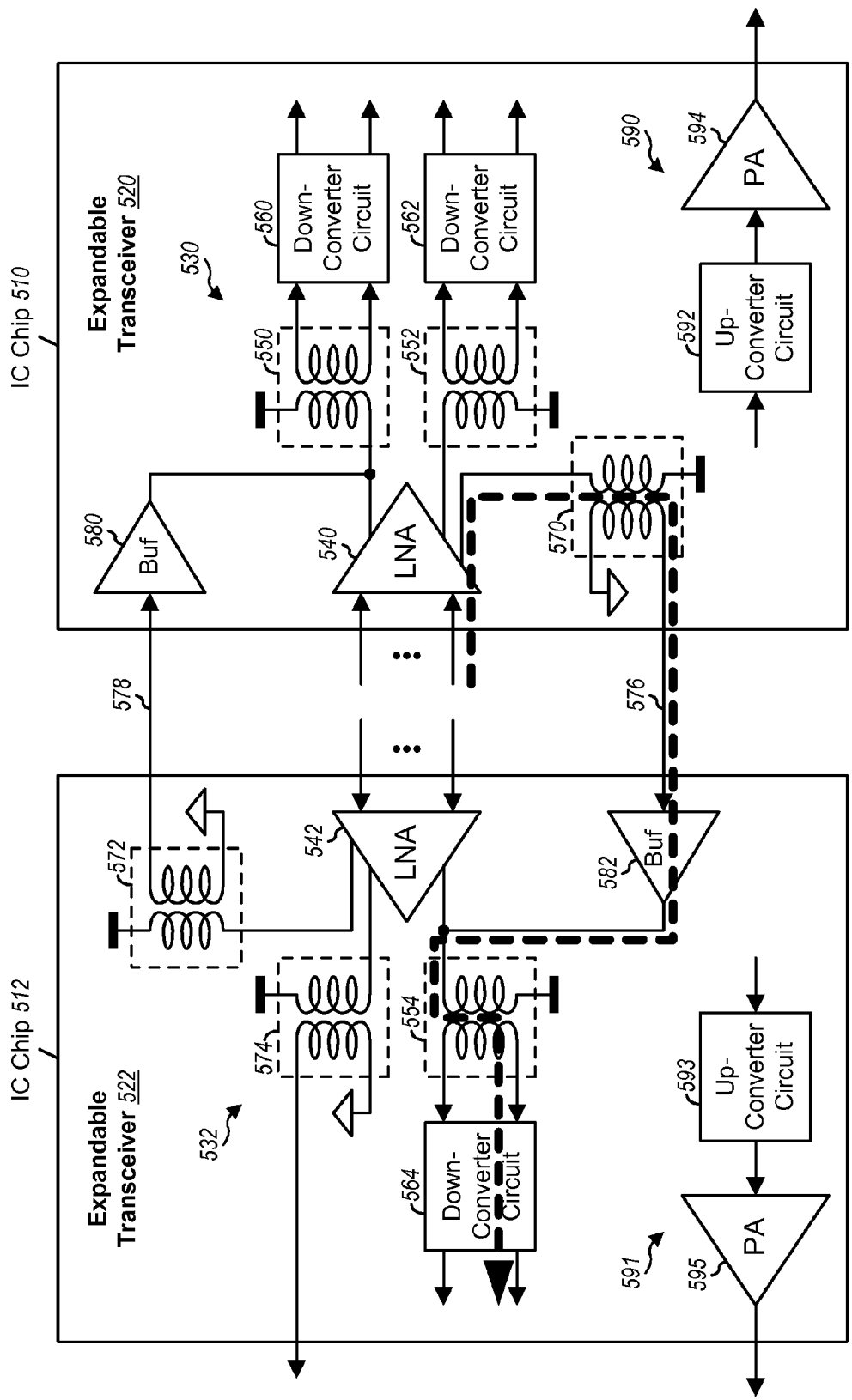

FIG. 6B shows operation of receivers 530 and 532 in a second operating mode to support one band with interconnection between IC chips 510 and 512. In this example, LNA 540 on IC chip 510 provides an output RF signal that is routed via interface circuit 570 on IC chip 510 to receiver 532 on IC chip 512. Within IC chip 512, the output RF signal is buffered by buffer 582 on IC chip 512, passed by load circuit 554, and provided to downconverter circuit 564. LNA 542 on IC chip 512 is disabled.

In a third operating mode to support two bands, LNA 540 provides a first output RF signal via load circuit 550 to downconverter circuit 560, as shown in FIG. 6A. LNA 540 also provides a second output RF signal via interface circuit 570 to buffer 582, load circuit 554, and downconverter circuit 564, as shown in FIG. 6B. LNA 540 thus drives both downconverters 560 and 564 on two IC chips 510 and 512.

Various other operating modes may also be supported by LNAs 540 and 542. In general, one LNA or both LNAs may be enabled at any given moment. Each enabled LNA may drive one or more on-chip downconverter circuits and/or an off-chip downconverter circuit. One or more on-chip and/or off-chip downconverter circuits may be selected based on isolation and/or other criteria.

Figure 7:
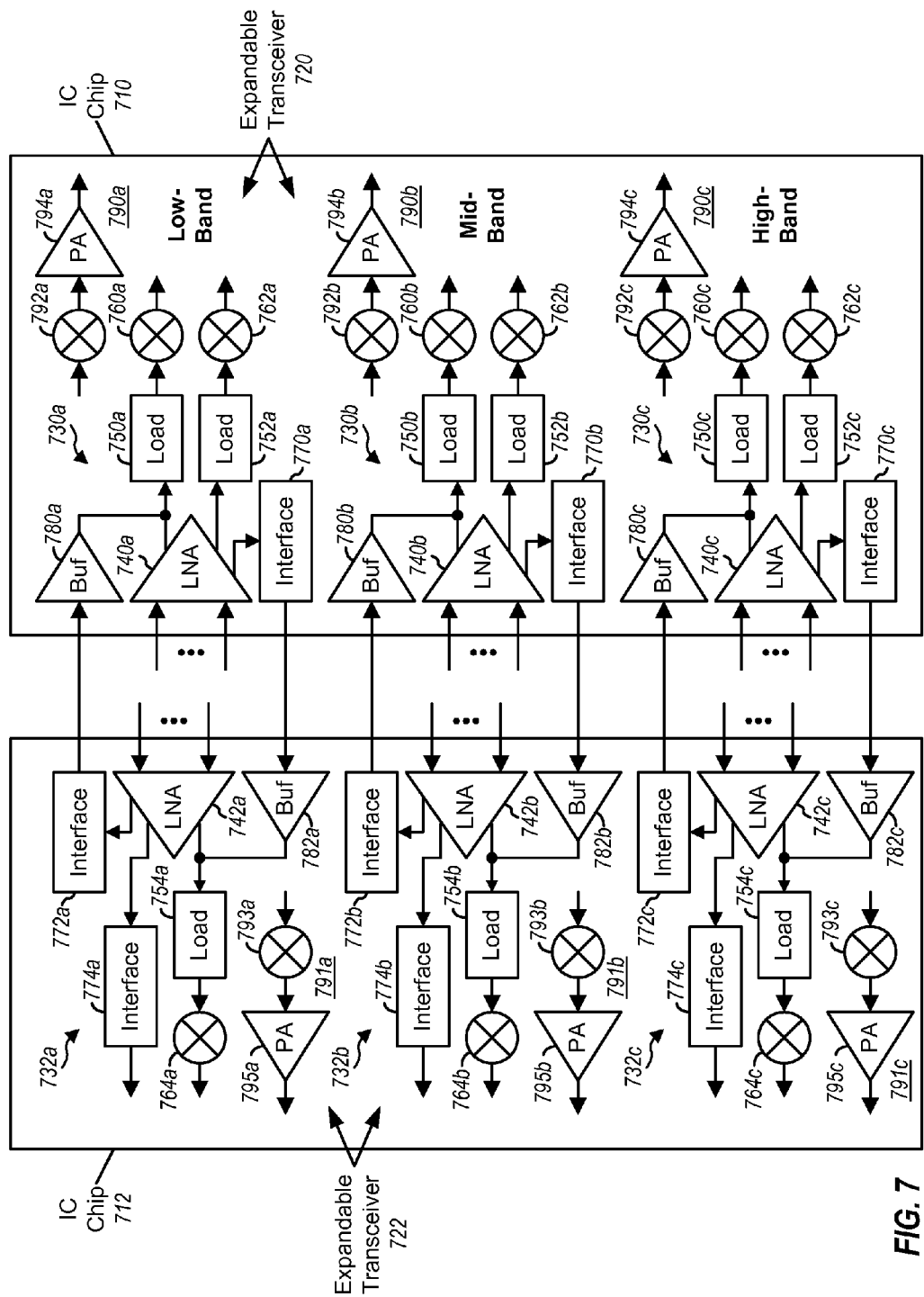
FIG. 7 shows expandable transceivers implemented on two IC chips.

FIG. 7 shows a block diagram of an exemplary design of two expandable transceivers 720 and 722 implemented on two IC chips 710 and 712, respectively. In the exemplary design shown in FIG. 7, transceiver 720 comprises (i) three expandable (2,1) receivers 730a, 730b, and 730c and three transmitters 790a, 790b, and 790c for low-band, mid-band, and high-band, respectively. Each receivers 730 includes an LNA 740, two load circuits 750 and 752, two downconverter circuits 760 and 762, an interface circuit 770, and a buffer 780, which are coupled as described above for LNA 540, load circuits 550 and 552, downconverter circuits 560 and 562, interface circuit 570, and buffer 580 in FIG. 5. Each transmitter 790 includes an upconverter circuit 792 coupled to a PA 794.

In the exemplary design shown in FIG. 7, transceiver 722 comprises (i) three expandable (1,2) receivers 732a, 732b, and 732c and three transmitters 791a, 791b, and 791c for low-band, mid-band, and high-band, respectively. Each receivers 732 includes an LNA 742, a load circuit 754, a downconverter circuit 764, two interface circuits 772 and 774, and a buffer 782, which are coupled as described above for LNA 542, load circuit 554, downconverter circuit 564, interface circuits 572 and 574, and buffer 582 in FIG. 5. Each transmitter 791 includes an upconverter circuit 793 coupled to a PA 795.

FIG. 7 also shows an exemplary design of the interconnection between receivers 730 and 732 for each band group. For low-band, the output of interface circuit 770a on IC chip 710 is coupled to the input of buffer 782a on IC chip 712. The output of interface circuit 772a within IC chip 712 is coupled to the input of buffer 780a on IC chip 710. Interface circuit 770b and 772b and buffers 780b and 782b for mid-band as well as interface circuit 770c and 772c and buffers 780c and 782c for high-band are coupled in similar manner as interface circuit 770a and 772a and buffers 780a and 782a for low-band.

The circuits in receivers 730a 732a and transmitters 790a and 791a are designed for low-band. The circuits in receivers 730b and 732b and transmitters 790b and 791b are designed for mid-band. The circuits in receivers 730c and 732c and transmitters 790c and 791c are designed for high-band. Each receiver 730 or 732 may support one or more bands in its band group. Similarly, each transmitter 790 or 791 may support one or more bands in its band group.

Figure 8:
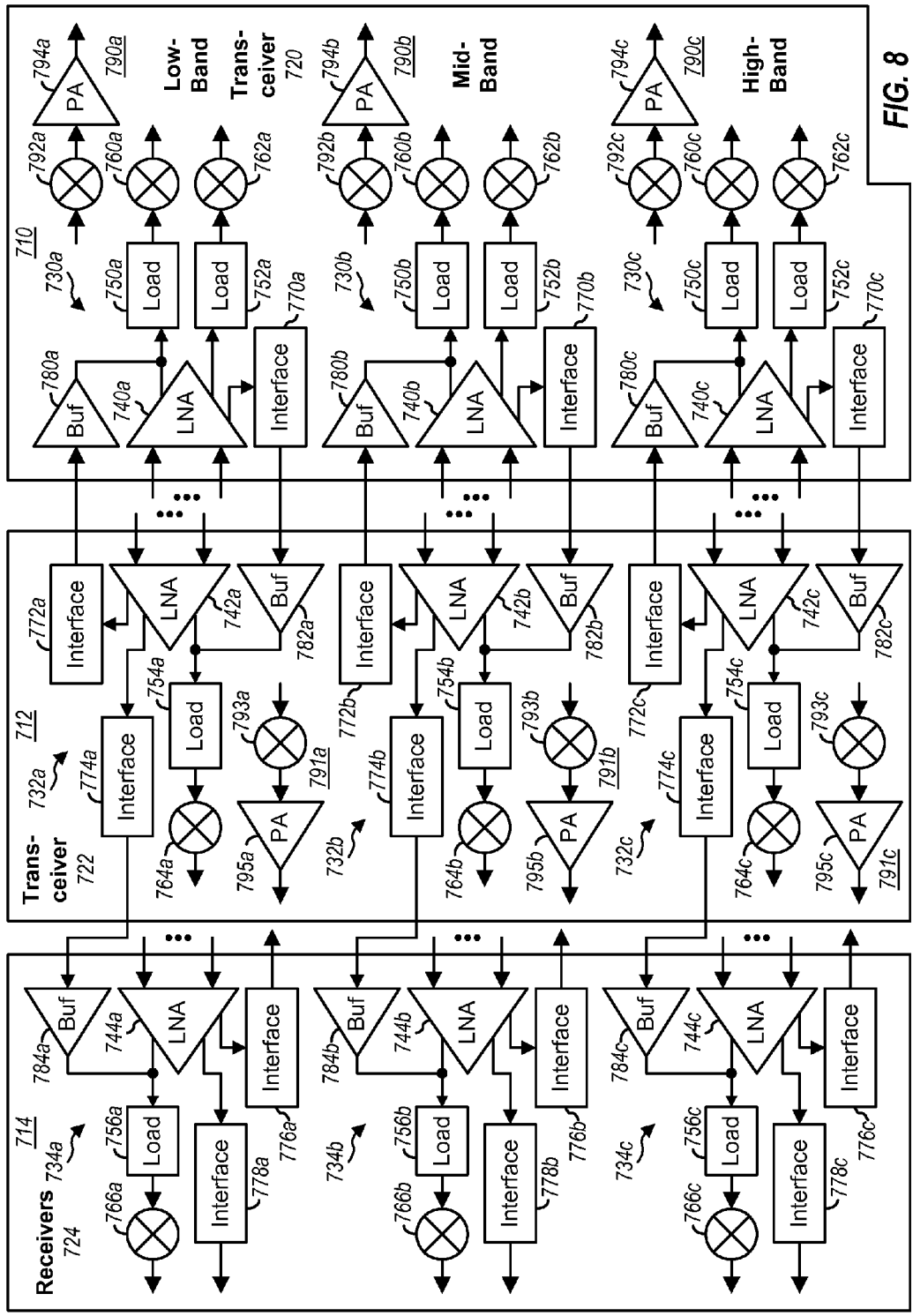
FIG. 8 shows expandable transceivers and receivers implemented on three IC chips.

FIG. 8 shows a block diagram of an exemplary design of two expandable transceivers 720 and 722 and expandable receivers 724 implemented on three IC chips 710, 712 and 714, respectively. Transceivers 720 and 722 are described above for FIG. 7. In the exemplary design shown in FIG. 8, receivers 724 comprise three expandable (1,2) receivers 734a, 734b, and 734c for low-band, mid-band, and high-band, respectively. Each receivers 734 includes an LNA 744, a load circuit 756, a downconverter circuit 766, two interface circuits 776 and 778, and a buffer 784, which are coupled in similar manner as LNA 542, load circuit 554, downconverter circuit 564, interface circuits 572 and 574, and buffer 582 in FIG. 5. The outputs of interface circuits 774a, 774b, and 774c on IC chip 712 are coupled to the inputs of buffers 784a, 784b, and 784c, respectively, on IC chip 714. Interface circuits 776a, 776b, 776c, 778a, 778b and 778c on IC chip 714 may be coupled to other circuits, e.g., other receivers on other IC chips.

In another exemplary design, two expandable transceivers and expandable receivers may be implemented on three IC chips. The first expandable transceiver may comprise transceiver 722 in FIG. 7 (instead of transceiver 720). The second expandable transceiver may comprise transceiver 722 in FIG. 7. The expandable receivers may comprise receivers 724 in FIG. 8. In yet another exemplary design, three expandable transceivers may be implemented on three IC chips. The first expandable transceiver may comprise transceiver 720 in FIG. 7, the second expandable transceiver may comprise transceiver 722 in FIG. 7, and the third expandable transceiver may comprise transceiver 722 in FIG. 7. In general, any number of expandable transceivers and any number of expandable receivers may be implemented on any number of IC chips. Each expandable transceiver may include any number of expandable receivers for any number of band groups, radio technologies, etc. Each expandable receiver may include any number of on-chip LNA outputs and any number of off-chip LNA outputs. An expandable transceiver may include multiple expandable receivers having (i) the same or different numbers of on-chip LNA outputs and (ii) the same or different numbers of off-chip LNA outputs.

As shown in FIGS. 5 to 8, communication via multiple carriers may be supported with receivers and transmitters implemented on multiple IC chips. An amplified RF signal for a given RX band may be sent between multiple IC chips to match a TX band in order to reduce spurious content from unpaired TX bands. The modular design of the expandable transceivers may allow any number of IC chips to be coupled together to support any number of carriers, any number of bands, and any number of band groups. LO leakage may be reduced due to a buffered interface across IC chips.

Multi-output LNAs with one or more on-chip outputs and one or more off-chip outputs may be implemented with various circuit architectures. Buffers to receive incoming amplified RF signals may also be implemented with various circuit architectures. Some exemplary designs of multi-output LNAs and buffers are described below. Multi-output LNAs and buffers may also be implemented with transistors of various types. Some exemplary designs of multi-output LNAs and buffers implemented with N-channel metal oxide semiconductor (NMOS) transistors are described below.

Figure 9A:
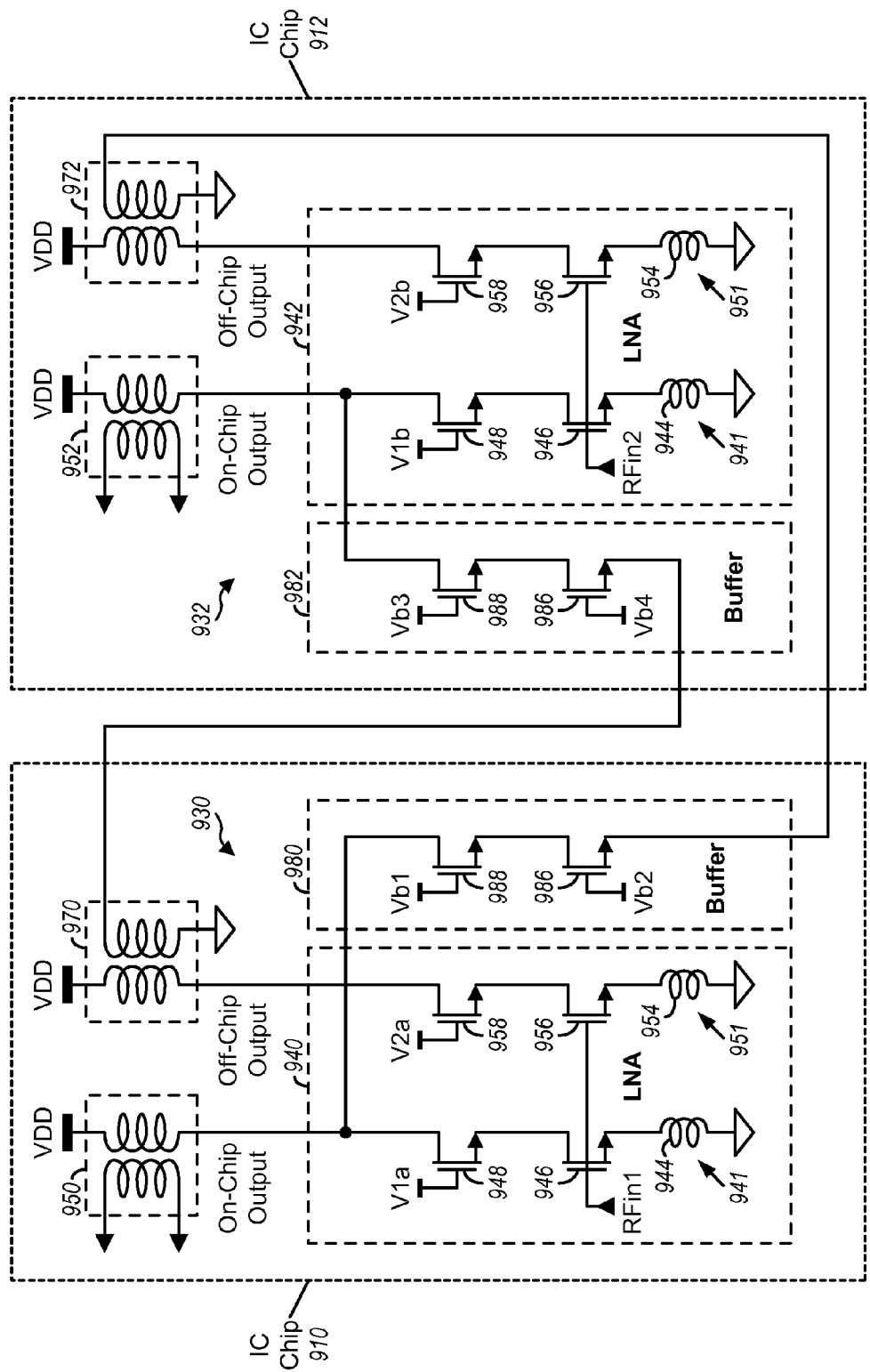
FIGS. 9A and 9B show two exemplary designs of an LNA and a buffer.

FIG. 9A shows a schematic diagram of an exemplary design of multi-output LNAs 940 and 942 and buffers 980 and 982. An expandable receiver 930 implemented on an IC chip 910 includes LNA 940, a load circuit 950, an interface circuit 970, and buffer 980. An expandable receiver 932 implemented on an IC chip 912 includes LNA 942, a load circuit 952, an interface circuit 972, and buffer 982.

In the exemplary design shown in FIG. 9A, LNA 940 includes two amplifier circuits 941 and 951. Amplifier circuit 941 receives a first input RF signal (RFin1) and provides a first output RF signal to an on-chip output of LNA 940. Amplifier circuit 951 receives the same RFin1 signal and provides a second output RF signal to an off-chip output of LNA 940. Amplifier circuit 941 includes a gain transistor 946, a cascode transistor 948, and a source degeneration inductor 944. Gain transistor 946 has its gate receiving the RFin1 signal and its source coupled to one end of inductor 944. The other end of inductor 944 is coupled to circuit ground. Cascode transistor 948 has its source coupled to the drain of gain transistor 946, its gate receiving a V1a control signal, and its drain providing the first output RF signal to load circuit 950. Amplifier circuit 951 includes a gain transistor 956, a cascode transistor 958, and a source degeneration inductor 954, which are coupled in similar manner as gain transistor 946, cascode transistor 948, and source degeneration inductor 944 in amplifier circuit 941. Gain transistor 956 has its gate receiving the RFin1 signal. Cascode transistor 958 has its gate receiving a V2a control signal and its drain providing a second output RF signal to interface circuit 970.

In the exemplary design shown in FIG. 9A, buffer 980 includes a current buffer transistor 986 and a cascode transistor 988. Transistor 986 has its gate receiving a Vb2 control signal and its source receiving an incoming amplified RF signal. Cascode transistor 988 has its source coupled to the drain of transistor 986, its gate receiving a Vb1 control signal, and its drain coupled to the drain of cascode transistor 948, which is the on-chip output of LNA 940. In the exemplary design shown in FIG. 9A, interface circuit 970 includes a transformer having (i) a primary coil coupled to the off-chip output of LNA 940 and (ii) a secondary coil providing an amplified RF signal. Interface circuit 970 and buffer 980 provide a low-impedance/broadband interface for receiver 930.

In the exemplary design shown in FIG. 9A, LNA 942 includes two amplifier circuits 941 and 951, which are implemented in similar manner as two amplifier circuits 941 and 951 in LNA 940. Buffer 982 is implemented in similar manner as buffer 980. The transistors in LNAs 940 and 942 and buffers 980 and 982 may be implemented with NMOS transistors (as shown in FIG. 9A) or with transistors of other types.

FIG. 9A shows exemplary interconnection between receivers 930 and 932. The output of interface circuit 970 on IC chip 910 may be coupled to the input of buffer 982 on IC chip 912. Similarly, the output of interface circuit 972 on IC chip 912 may be coupled to the input of buffer 980 on IC chip 910. Alternatively, the output of interface circuit 972 on IC chip 912 may be coupled to a buffer on a third IC chip (not shown in FIG. 9A).

Figure 9B:
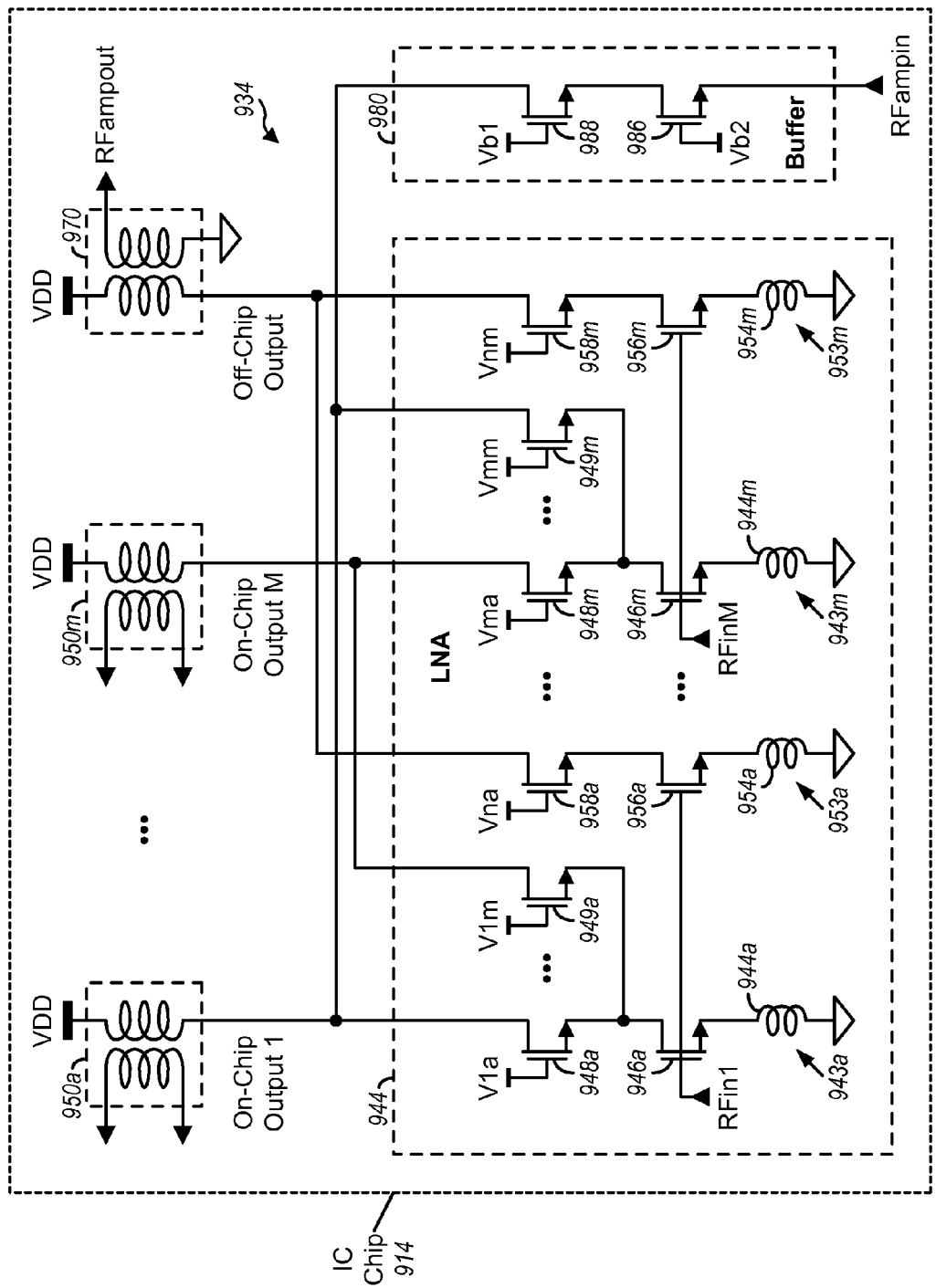

FIG. 9B shows a schematic diagram of an exemplary design of a multi-input multi-output LNA 944. In the exemplary design shown in FIG. 9B, LNA 944 includes M amplifier circuits 943a to 943m for M on-chip outputs of LNA 944, where M may be any integer value. Amplifier circuit 943a receives a first input RF signal (RFin1) and provides a first output RF signal to one of the M on-chip outputs of LNA 940. Amplifier circuit 943a includes a gain transistor 946a, M cascode transistors 948a to 949a, and a source degeneration inductor 944a. Gain transistor 946a has its gate receiving the RFin1 signal and its source coupled to one end of inductor 944a. The other end of inductor 944a is coupled to circuit ground. Cascode transistors 948a to 949a have their sources coupled to the drain of gain transistor 946a, their gates receiving V1a to V1m control signals, and their drains coupled to load circuits 950a to 950m, respectively. Each remaining amplifier circuit 943 within LNA 940 may be coupled in similar manner as amplifier circuit 943a.

LNA 944 further includes M amplifier circuits 953a to 953m for the off-chip output of LNA 944. Amplifier circuit 953a includes a gain transistor 956a, a cascode transistor 958a, and a source degeneration inductor 954a, which are coupled in similar manner as gain transistor 946a, cascode transistor 948a, and source degeneration inductor 944a in amplifier circuit 943a. Gain transistor 956a has its gate receiving the RFin1 signal. Cascode transistor 958a has its gate receiving a Vna control signal and its drain coupled to interface circuit 970. Each remaining amplifier circuit 953 may be coupled in similar manner as amplifier circuit 953a.

FIGS. 9A and 9B show exemplary designs of LNAs 940, 942 and 944 and buffers 980 and 982. LNA 940, 942 and/or 944 may include additional amplifier circuits for additional on-chip and/or off-chip outputs.

LNAs 940, 942 and 944 and buffers 980 may also be implemented in other manners. In exemplary design, an amplifier circuit in an LNA may include a gain transistor having its source coupled directly to circuit ground (instead of to a source degeneration inductor). In yet another exemplary design, multiple amplifier circuits in an LNA may share the same source degeneration inductor.

In another exemplary design, an amplifier circuit may include a feedback circuit coupled between the input and output of the amplifier circuit. The feedback circuit may include a resistor, a capacitor, a switch, some other circuit component, or a combination thereof. The feedback circuit may be used to improve the linearity and input matching of the amplifier circuit.

In yet another exemplary design, an amplifier circuit may include two gain transistors coupled in parallel and having their gates receiving the input RF signal. A first gain transistor may have its source coupled to a source degeneration inductor, as shown in FIGS. 9A and 9B. A second gain transistor may have its source coupled directly to circuit ground. Either the first or second gain transistor may be selected depending on the received power of the input RF signal.

Figure 10:
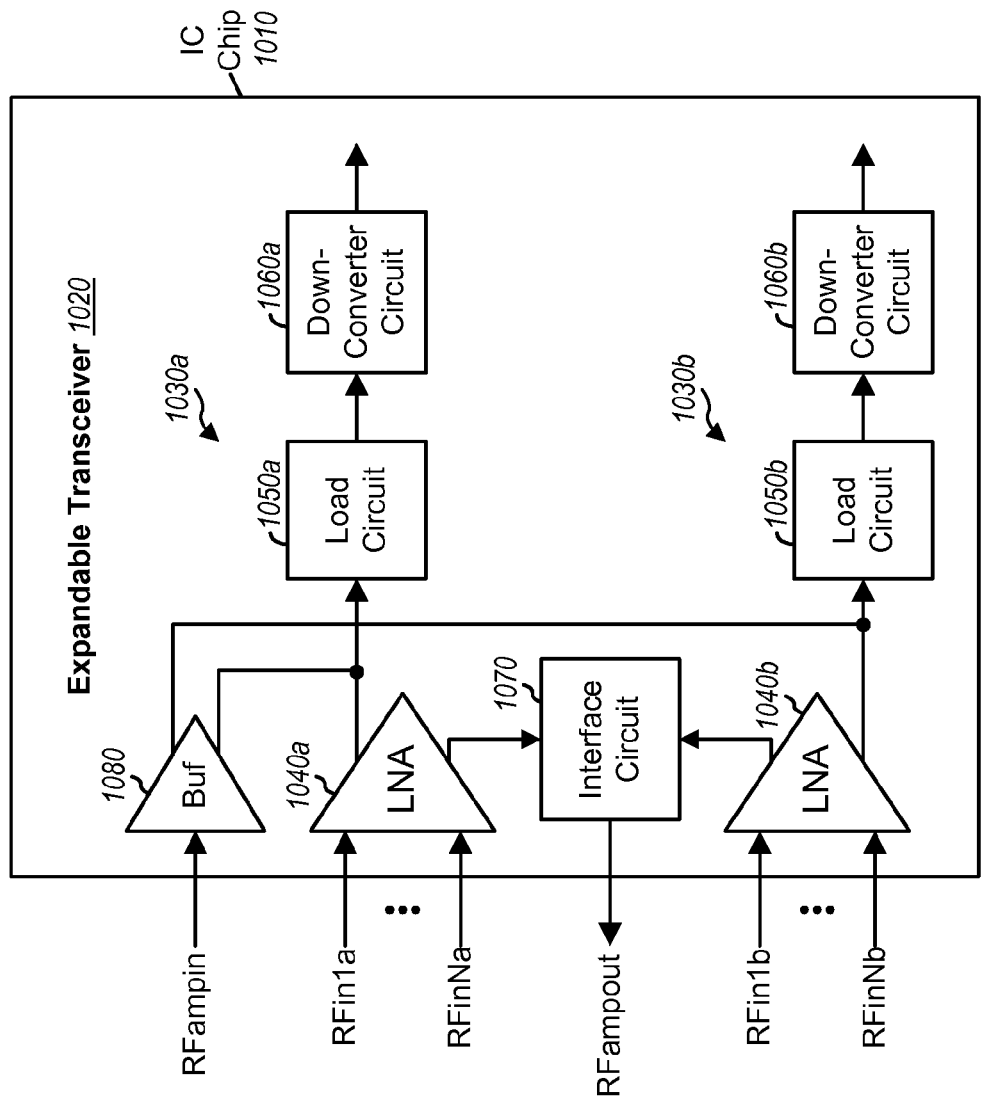
FIG. 10 shows an expandable transceiver with multi-band interface.

FIG. 10 shows a block diagram of an exemplary design of an expandable transceiver 1020 with multi-band interface implemented on an IC chip 1010. Transceiver 1020 comprises an expandable receiver 1030a for a first band group (e.g., low-band), an expandable receiver 1030b for a second band group (e.g., mid-band), an interface circuit 1070 for both band groups, and a buffer 1080 for both band groups. Receiver 1030a includes an LNA 1040a, a load circuit 1050a, and a downconverter circuit 1060a for the first band group. LNA 1040a includes an on-chip output coupled to load circuit 1050a and an off-chip output coupled to interface circuit 1070. Receiver 1030b includes an LNA 1040b, a load circuit 1050b, and a downconverter circuit 1060b for the second band group. LNA 1040b includes an on-chip output coupled to load circuit 1050b and an off-chip output coupled to interface circuit 1070. Buffer 1080 includes a first output coupled to the on-chip output of LNA 1040a and a second output coupled to the on-chip output of LNA 1040b.

In the exemplary design shown in FIG. 10, interface circuit 1070 is shared by both LNAs 1040a and 1040b. Interface circuit 1070 may receive an output RF signal from either LNA 1040a or 1040b and provide an amplified RF signal to a receiver on another IC chip. Similarly, buffer 1080 is shared by both LNAs 1040a and 1040b. Buffer 1080 may receive an amplified RF signal from an external receiver on another IC chip and provide a buffered RF signal to either LNA 1040a and/or LNA 1040b.

Figure 11A:
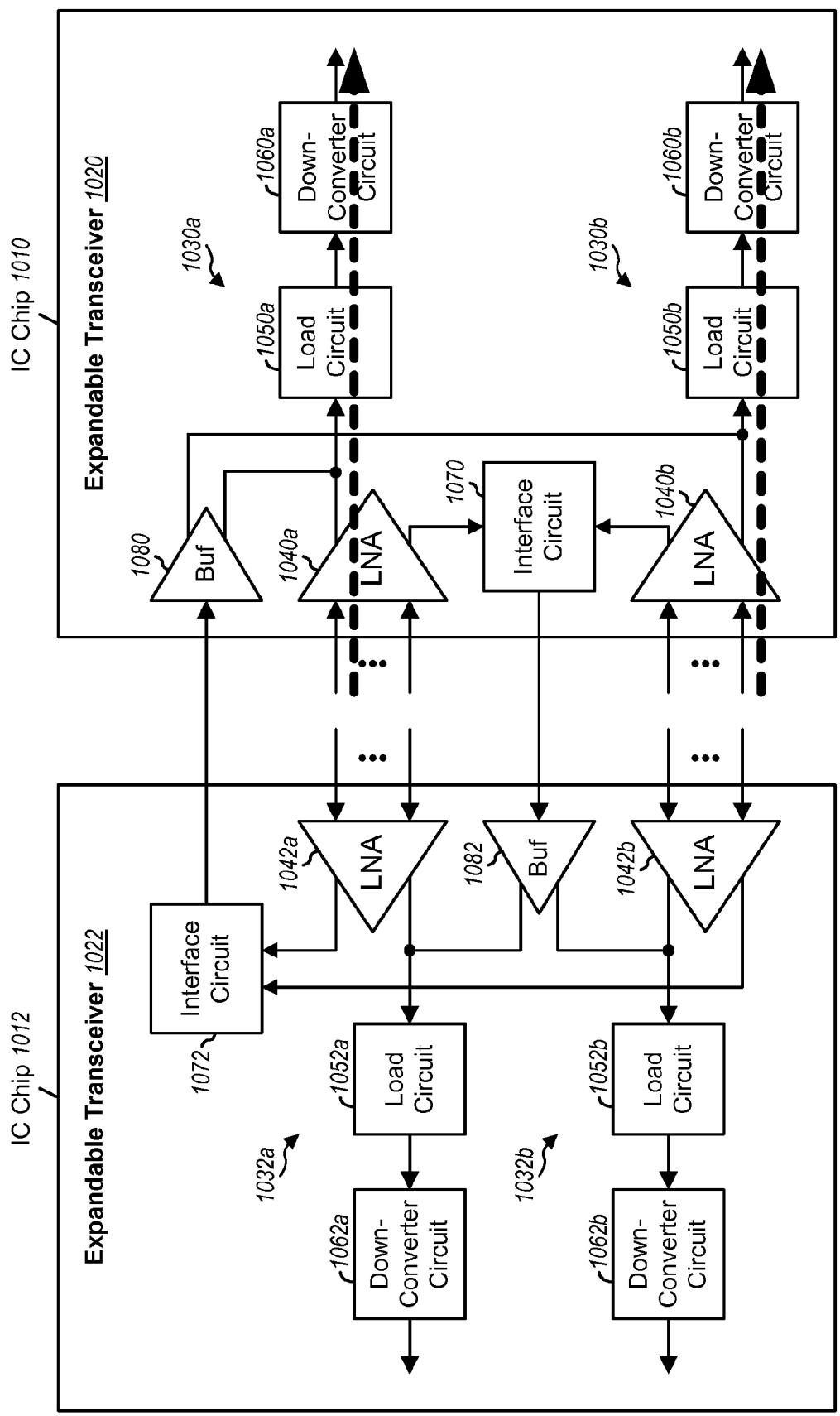
FIGS. 11A to 11C show three modes of operation of two expandable transceivers with multi-band interface implemented on two IC chips.

FIG. 11A shows a block diagram of an exemplary design of two expandable transceivers 1020 and 1022 with multi-band interface implemented on two IC chips 1010 and 1012, respectively. Transceiver 1020 is described for FIG. 10. Transceiver 1022 comprises an expandable receiver 1032a for the first band group (e.g., low-band), an expandable receiver 1032b for the second band group (e.g., mid-band), an interface circuit 1072 for both band groups, and a buffer 1082 for both band groups. Receiver 1032a includes an LNA 1042a, a load circuit 1052a, and a downconverter circuit 1062a for the first band group. Receiver 1032b includes an LNA 1042b, a load circuit 1052b, and a downconverter circuit 1062b for the band group. Interface circuit 1072 is shared by both LNAs 1042a and 1042b, and buffer 1082 is also shared by both LNAs 1042a and 1042b. The output of interface circuit 1070 on IC chip 1010 is coupled to the input of buffer 1082 on another IC chip 1012. The output of interface circuit 1072 on IC chip 1012 is coupled to the input of buffer 1080 on another IC chip 1010.

FIG. 11A also shows operation of transceivers 1020 and 1022 in a first operating mode to support two bands. In this example, LNA 1040a provides a first output RF signal for the first band group to load circuit 1050a, and LNA 1040b provides a second output RF signal for the second band group to load circuit 1050b. LNAs 1042a and 1042b are disabled. No RF signals are passed between transceiver 1020 on IC chip 1010 and transceiver 1022 on IC chip 1012. Although not shown in FIG. 11A, two transmitters on IC chip 1010 may be used for transmission on the first and second bands.

Figure 11B:
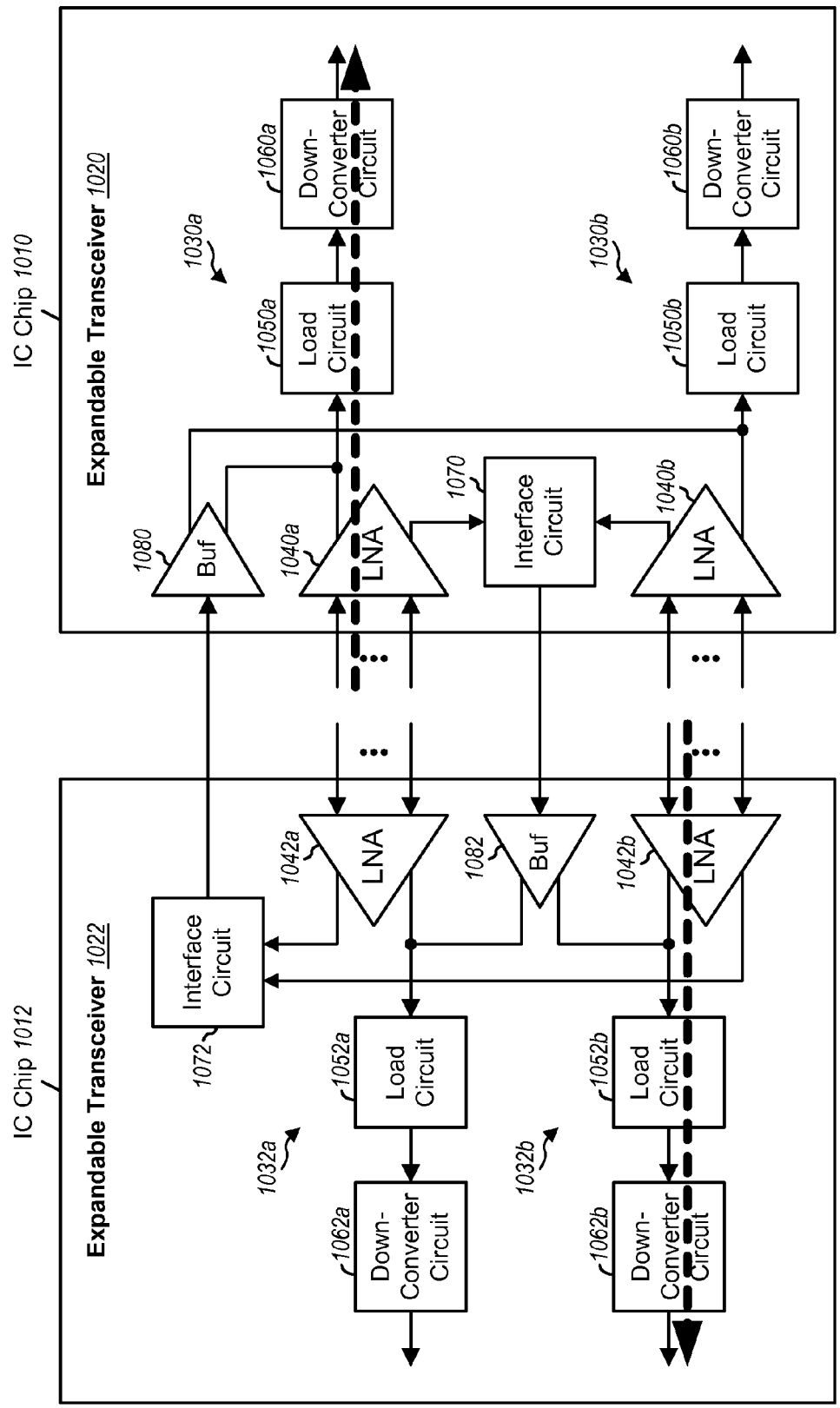

FIG. 11B shows operation of transceivers 1020 and 1022 in a second operating mode to support two bands. In this example, LNA 1040a provides a first output RF signal for the first band group to load circuit 1050a on IC chip 1010. LNA 1042b provides a second output RF signal for the second band group to load circuit 1052b on IC chip 1012. LNAs 1040b and 1042a are disabled. No RF signals are passed between transceiver 1020 on IC chip 1010 and transceiver 1022 on IC chip 1012. Although not shown in FIG. 11B, a first transmitter on IC chip 1010 may be used for transmission on the first band group, and a second transmitter on IC chip 1012 may be used for transmission on the second band group.

Figure 11C:
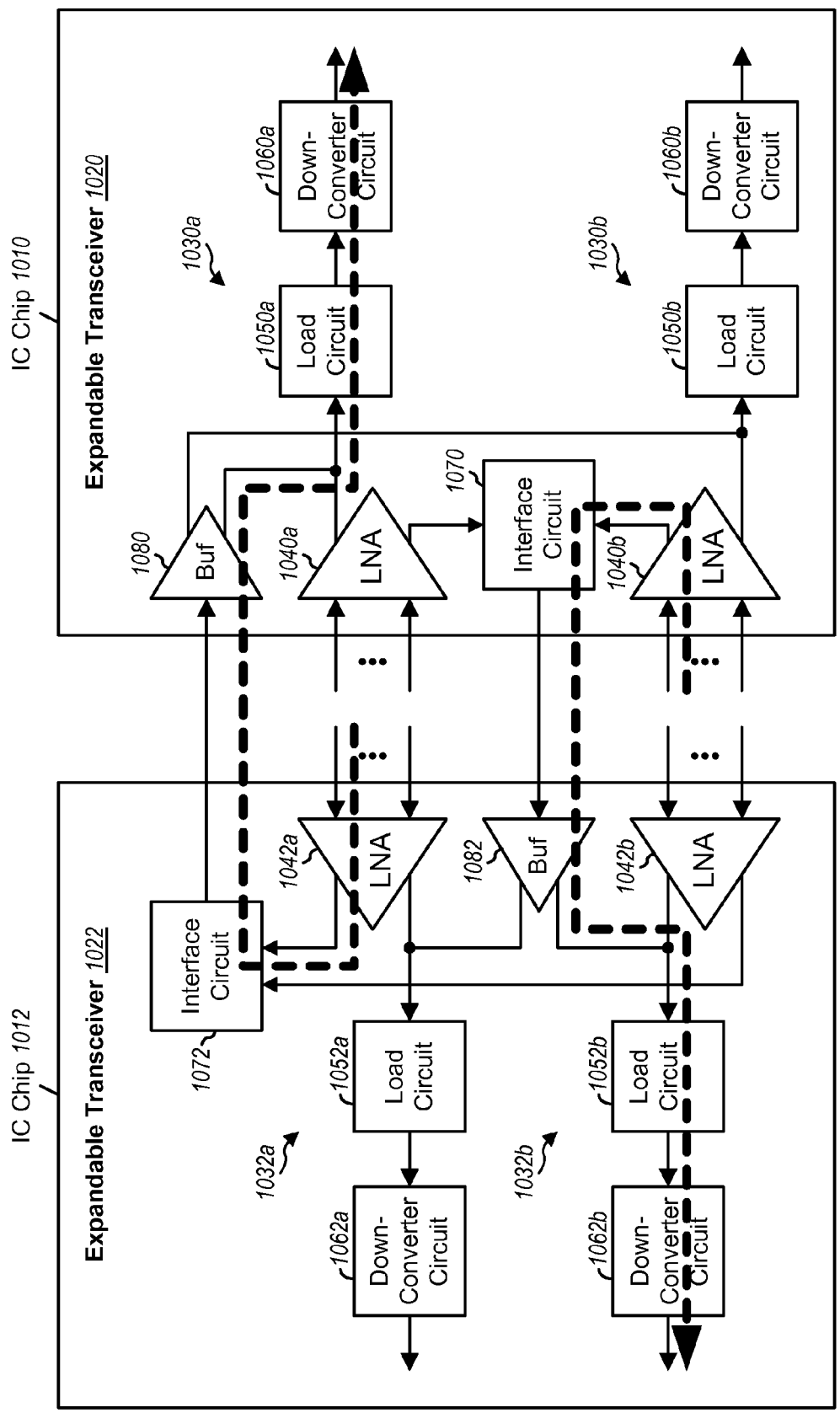

FIG. 11C shows operation of transceivers 1020 and 1022 in a third operating mode to support two bands with interconnection between IC chips 1010 and 1012. In this example, LNA 1042a on IC chip 1010 provides a first output RF signal for the first band group, which is routed via interface circuit 1072 on IC chip 1012 to buffer 1080 and load circuit 1050a on IC chip 1010. LNA 1040b on IC chip 1010 provides a second output RF signal for the second band group, which is routed via interface circuit 1070 on IC chip 1010 to buffer 1082 and load circuit 1052b on IC chip 1012. Although not shown in FIG. 11C, a first transmitter on IC chip 1010 may be used for transmission on the first band group, and a second transmitter on IC chip 1012 may be used for transmission on the second band group.

Various other operating modes may also be supported by transceivers 1020 and 1022. In general, one or more LNAs may be enabled at any given moment. Each enabled LNA may drive one or more on-chip downconverters circuit and/or an off-chip downconverter circuit. On-chip and/or off-chip downconverter circuits may be selected based on isolation and/or other criteria.

Figure 12:
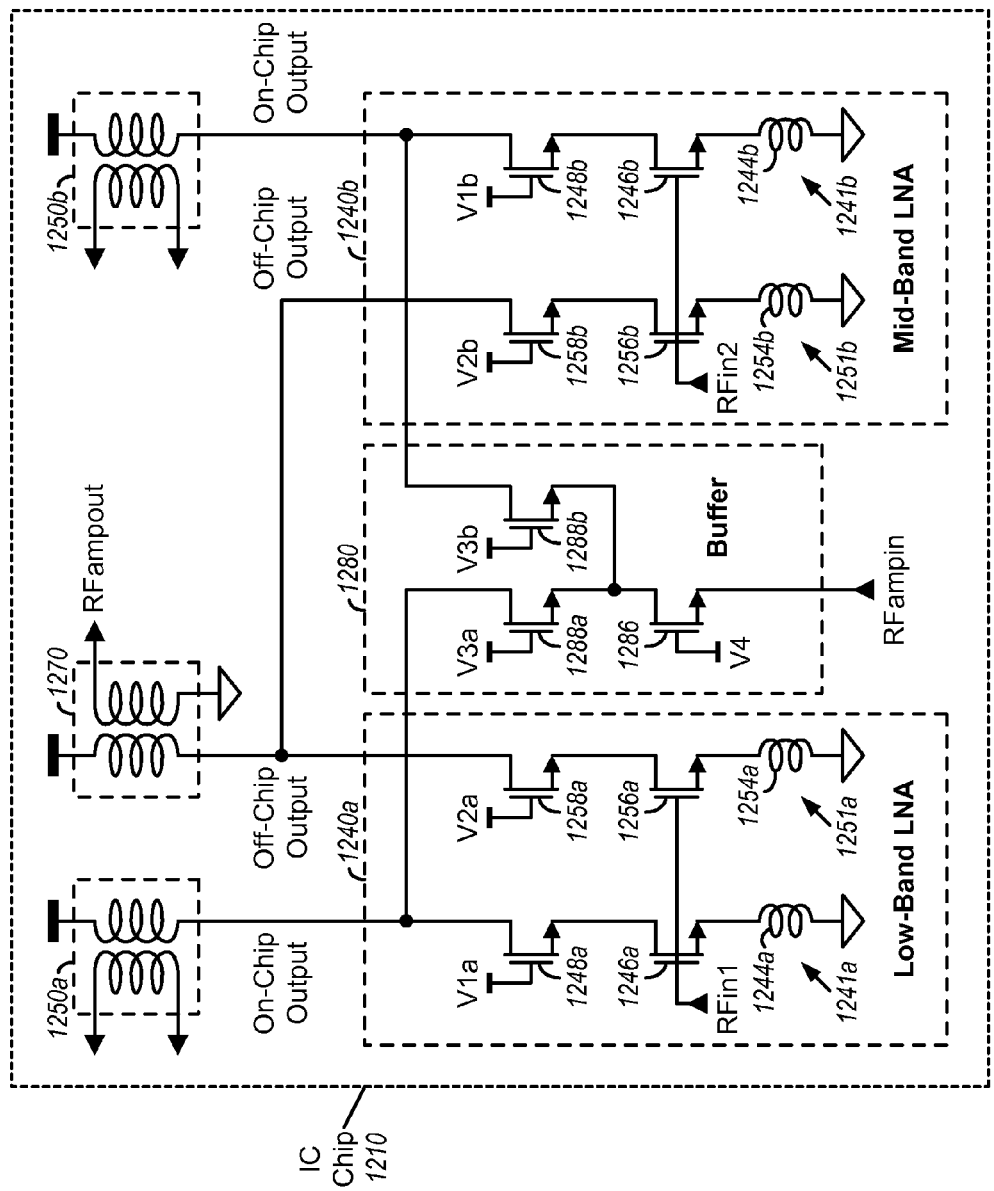
FIG. 12 shows expandable transceivers with shared multi-band interface.

FIG. 12 shows a schematic diagram of an exemplary design of two LNAs 1240a and 1240b in two receivers for two band groups. The two receivers share an interface circuit 1270 and a buffer 1280. In the exemplary design shown in FIG. 12, LNA 1240a includes two amplifier circuits 1241a and 1251a implemented with gain transistors 1246a and 1256a, cascode transistors 1248a and 1258a, and source degeneration inductors 1244a and 1254a, which are coupled as shown in FIG. 12. The drain of cascode transistor 1248a forms an on-chip output of LNA 1240a and is coupled to load circuit 1250a. Similarly, LNA 1240b includes two amplifier circuits 1241b and 1251b implemented with gain transistors 1246b and 1256b, cascode transistors 1248b and 1258b, and source degeneration inductors 1244b and 1254b, which are coupled as shown in FIG. 12. The drain of cascode transistor 1248b forms an on-chip output of LNA 1240b and is coupled to load circuit 1250b.

In the exemplary design shown in FIG. 9A, buffer 1280 includes a current buffer transistor 1286 and cascode transistors 1288a and 1288b. Transistor 1286 has its source receiving an incoming amplified RF signal. Cascode transistors 1288a and 1288b have their sources coupled to the drain of transistor 1286 and their drains coupled to the drains of cascode transistors 1248a and 1248b, respectively.

FIG. 12 shows an exemplary design of LNAs 1240a and 1240b and buffer 1280 for two band groups. The LNAs and buffer may also be implemented in other manners, as described above.

The expandable transceivers and receivers described herein may provide various advantages. First, the expandable transceivers and receivers implemented on multiple IC chips may improve isolation. Stringent RX/TX isolation requirements may be met by splitting the receiver inputs and transmit outputs between multiple IC chips, since chip-to-chip isolation is typically better than pin-to-pin isolation. The issues related to isolation between transceivers implemented on a single IC chip described above may be mitigated. RX/TX signals belonging to the same band may be paired on the same IC chip, so that receive downconversion and transmit upconversion for the same band are on the same IC chip. In the inter-CA mode, multiple PLLs for receivers for different band groups may be split between multiple IC chips (e.g., as shown in FIGS. 11B and 11C), which may mitigate spurious tones from one PLL for one band group from disturbing a receiver for another band group. Buffering amplified RF signal with interface circuits and buffers between IC chips may reduce the amount of LO leakage from one receiver into another receiver. Second, sensitivity of receivers implemented on different IC chips may not be degraded as compared to sensitivity of receivers implemented on a single IC chip.

Third, the modular design of the expandable transceivers and receivers may allow any number of IC chips to be interconnected. Expandable transceivers and receivers may be implemented on two IC chips and used to support communication on at least two sets of carriers while offering more isolation between multiple receivers. Expandable transceivers and receivers may be implemented on three IC chips and used to support communication on at least three sets of carriers while offering more isolation between multiple receivers.

In an exemplary design, an apparatus (e.g., a wireless device, an IC, a circuit module, etc.) may include an LNA and an interface circuit. The LNA (e.g., LNA 440 in FIG. 4 of LNA 540 in FIG. 5) may reside on an IC chip (e.g., IC chip 410 in FIG. 4 or IC chip 510 in FIG. 5) and may comprise a first/on-chip output and a second/off-chip output. The interface circuit (e.g., interface circuit 470 in FIG. 4 or interface circuit 570 in FIG. 5) may also reside on the same IC chip and may receive or be coupled to the second output of the LNA. The interface circuit may provide an amplified RF signal outside of the IC chip. The apparatus may further comprise a buffer, a load circuit, and a downconverter circuit. The buffer (e.g., buffer 480 in FIG. 4 or buffer 580 in FIG. 5) may reside on the IC chip and may be coupled to the first output of the LNA. The buffer may receive a second amplified RF signal from outside of the IC chip. The load circuit (e.g., load circuit 450 in FIG. 4 or load circuit 550 in FIG. 5) may be coupled to the first output of the LNA. The downconverter circuit (e.g., downconverter circuit 460 in FIG. 4 or downconverter circuit 560 in FIG. 5) may be coupled to the load circuit.

In an exemplary design, the load circuit may comprise a transformer having a primary coil coupled to the first output of the LNA and a secondary coil providing a differential output RF signal, e.g., as shown in FIG. 5. In an exemplary design, the interface circuit may comprise a transformer having a primary coil coupled to the second output of the LNA and a secondary coil providing the amplified RF signal, e.g., as also shown in FIG. 5.

In an exemplary design, the apparatus may comprise a second LNA and a second buffer. The second LNA (e.g., LNA 542 in FIG. 5) may reside on a second IC chip (e.g., IC chip 512) and may comprise a first/on-chip output and a second/off-chip output. The second buffer (e.g., buffer 582) may reside on the second IC chip and may comprise an output coupled to the first output of the second LNA and an input coupled to the interface circuit on the IC chip. The apparatus may further comprise a second downconverter circuit (e.g., downconverter circuit 564) residing on the second IC chip and operatively (e.g., directly or indirectly) coupled to the first output of the second LNA. The second downconverter circuit may downconvert an RF signal that is provided by the second output of the LNA, passed by the interface circuit from the IC chip to the second IC chip, and buffered by the second buffer on the second CC. The apparatus may further comprise a second interface circuit (e.g., interface circuit 572) residing on the second IC chip and coupled to the second output of the second LNA. The second interface circuit may provide a second amplified RF signal outside of the second IC chip.

In an exemplary design, the apparatus may comprise a second LNA (e.g., LNA 740b in FIG. 7 or LNA 1040b in FIG. 10) on the same IC chip and comprising a first/on-chip output and a second/off-chip output. The LNA may be for a first band group (e.g., low-band), and the second LNA may be for a second band group (e.g., mid-band). The interface circuit (e.g., interface circuit 1070 in FIG. 10) may be shared by both the LNA and the second LNA and may be further coupled to the second output of the second LNA. The interface circuit may receive a first output RF signal from the LNA or a second output RF signal from the second LNA and may provide the amplified RF signal outside of the IC chip. The apparatus may further include a buffer (e.g., buffer 1080) that is (i) shared by both the LNA and the second LNA and (ii) coupled to the first output of the LNA and the first output of the second LNA. The buffer may receive a second amplified RF signal from outside of the IC chip and provide a buffered RF signal to the first output of the LNA or the first output of the second LNA.

In an exemplary design, the LNA may comprise first and second amplifier circuits. The first amplifier circuit (e.g., amplifier circuit 941 in FIG. 9A or amplifier circuit 943a in FIG. 9B) may receive an input RF signal and provide a first output RF signal to the first output of the LNA. The second amplifier circuit (e.g., amplifier circuit 951 in FIG. 9A or amplifier circuit 953a in FIG. 9B) may also receive the input RF signal and provide a second output RF signal to the second output of the LNA. The LNA may further comprise a third amplifier circuit (e.g., amplifier circuit 943m in FIG. 9B), which may receive a second input RF signal and provide a third output RF signal to the first output of the LNA. The LNA may comprise additional amplifier circuits.

In an exemplary design, the apparatus may further comprise a power amplifier (e.g., power amplifier 494 in FIG. 4) on the same IC chip as the LNA.

Figure 13:
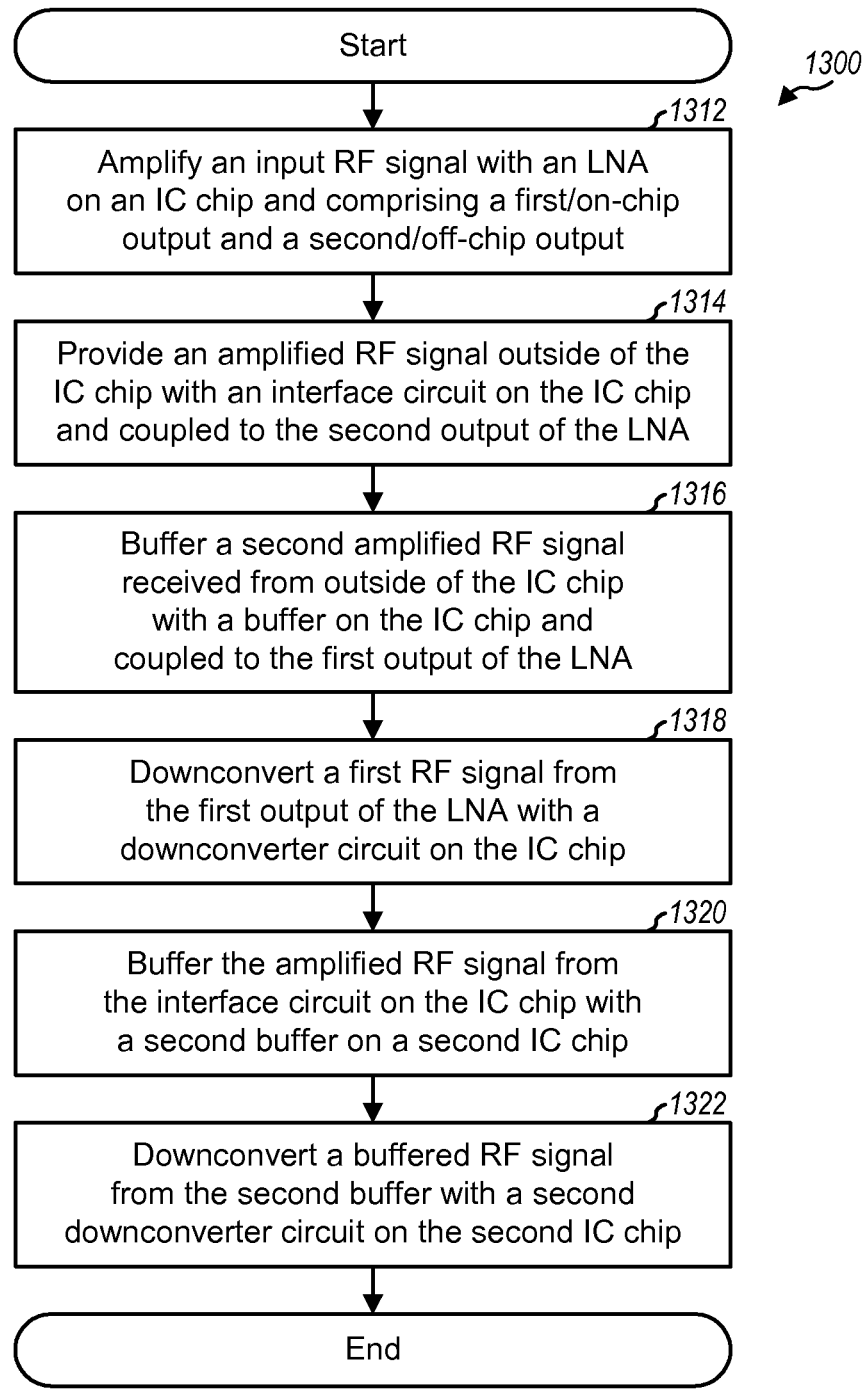
FIG. 13 shows a process for performing RF reception.

FIG. 13 shows an exemplary design of a process 1300 for performing RF reception. Process 1300 may be performed by a wireless device or by some other entity. An input RF signal may be amplified with an LNA residing on an IC chip and comprising a first/on-chip output and a second/off-chip output (block 1312). An amplified RF signal may be provided outside of the IC chip with an interface circuit residing on the IC chip and coupled to the second output of the LNA (block 1314). A second amplified RF signal received from outside of the IC chip may be buffered with a buffer residing on the IC chip and coupled to the first output of the LNA (block 1316). A first output RF signal from the first output of the LNA may be downconverted with a downconverter circuit on the IC chip (block 1318).

Alternatively or additionally, the amplified RF signal from the interface circuit on the IC chip may be buffered with a second buffer on a second IC chip (block 1320). A buffered RF signal from the second buffer may be downconverted with a second downconverter circuit on the second IC chip (block 1322).

The expandable transceivers and receivers described herein may be implemented on one or more ICs, analog ICs, RFICs, mixed-signal ICs, ASICs, printed circuit boards (PCBs), electronic devices, etc. The expandable transceivers and receivers may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the expandable transceivers and/or receivers described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
  a first low noise amplifier (LNA) on a first integrated circuit (IC) chip and comprising a first output and a second output;
  a first downconverter circuit on the first IC chip, the first downconverter circuit configured to receive a first amplified RF signal from the first LNA on the first IC chip in a first mode and the first downconverter circuit configured to receive a second amplified RF signal outputted by a first LNA on a second IC chip in a second mode; and
  an interface circuit on the first IC chip and configured to receive the second output of the first LNA on the first IC chip and to provide third amplified radio frequency (RF) signal outside of the first IC chip.

2. The apparatus of claim 1, further comprising:
  a buffer on the first IC chip and coupled to the first output of the first LNA, the buffer configured to receive the second amplified RF signal from outside of the first IC chip.

3. The apparatus of claim 1, further comprising:
  a load circuit coupled to the first output of the first LNA on the first IC chip; and
  the first downconverter circuit coupled to the load circuit.

4. The apparatus of claim 1, further comprising:
  a load circuit comprising a transformer having a primary coil coupled to the first output of the first LNA on the first IC chip and a secondary coil providing a differential output RF signal.

5. The apparatus of claim 1, the interface circuit on the first IC chip comprising a transformer having a primary coil coupled to the second output of the first LNA on the first IC chip and a secondary coil providing the third amplified RF signal.

6. The apparatus of claim 1, further comprising:
  the first LNA on the second IC chip comprising a first output and a second output; and
  a buffer on the second IC chip and comprising an output coupled to the first output of the first LNA on the second IC chip and an input coupled to the interface circuit on the first IC chip.

7. The apparatus of claim 6, further comprising:
  a first downconverter circuit on the second IC chip and coupled to the first output of the first LNA of the second IC chip, the first downconverter circuit configured to downconvert an RF signal provided by the second output of the first LNA on the second IC chip, passed by the interface circuit from the first IC chip to the second IC chip, and buffered by the buffer on the second IC chip.

8. The apparatus of claim 6, further comprising:
  an interface circuit on the second IC chip and coupled to the second output of the first LNA of the second IC chip, the interface circuit on the second IC chip configured to provide the second amplified RF signal outside of the second IC chip.

9. The apparatus of claim 1, further comprising:
  a second LNA on the first IC chip and comprising a first output and second output, the first LNA on the first IC chip being for a first band group and the second LNA being for a second band group.

10. The apparatus of claim 9, wherein the interface circuit on the first IC chip is further coupled to the first output of the second LNA and configured to receive a first output RF signal from the first LNA on the first IC chip or a second output RF signal from the second LNA and to provide the third amplified RF signal outside of the first IC chip.

11. The apparatus of claim 9, further comprising:
  a buffer coupled to the first output of the first LNA on the first IC chip and the first output of the second LNA and configured to receive the second amplified RF signal from outside of the first IC chip and provide a buffered RF signal to the first output of the first LNA on the first IC chip or the first output of the second LNA.

12. The apparatus of claim 1, wherein the LNA comprising:
  a first amplifier circuit configured to receive an input RF signal and provide a first output RF signal to the first output of the first LNA on the first IC chip, and
  a second amplifier circuit configured to receive the input RF signal and provide a second output RF signal to the second output of the first LNA on the first IC chip.

13. The apparatus of claim 12, wherein the first LNA on the first IC chip further comprising:
  a third amplifier circuit configured to receive a second input RF signal and provide a third output RF signal to the first output of the first LNA on the first IC chip.

14. The apparatus of claim 1, further comprising:
  a power amplifier on the first IC chip.

15. A method comprising:
amplifying an input radio frequency (RF) signal with a first low noise amplifier (LNA) on a first integrated circuit (IC) chip and the first LNA comprising a first output and a second output;
downconverting on the first IC chip a first amplified RF signal from the first LNA on the first IC chip in a first mode and downconverting on the first IC chip a second amplified RF signal outputted by a first LNA on a second IC chip in a second mode; and
providing a third amplified RF signal outside of the first IC chip with an interface circuit on the first IC chip and coupled to the second output of the first LNA on the first IC chip.

16. The method of claim 15, further comprising:
buffering the second amplified RF signal received from outside of the first IC chip with a buffer on the first IC chip and coupled to the first output of the first LNA on the first IC chip.

17. The method of claim 15, further comprising:
buffering the third amplified RF signal from the interface circuit on the first IC chip with a buffer on a second IC chip; and
downconverting a buffered RF signal from the buffer with a first downconverter circuit on the second IC chip.

18. An apparatus comprising:
first means for amplifying residing on a first integrated circuit (IC) chip and comprising a first output and a second output;
first means for downconverting on the first IC chip a first amplified RF signal from the first means for amplifying on the first IC chip in a first mode and downconverting on the first IC chip a second amplified RF signal outputted by a first means for amplifying on a second IC chip in a second mode; and
means for interfacing residing on the first IC chip and coupled to the second output of the first means for amplifying and providing a third amplified RF signal outside of the first IC chip.

19. The apparatus of claim 18, further comprising:
means for buffering coupled to the first output of the first means for amplifying on the first IC chip.

20. The apparatus of claim 18, further comprising:
means for buffering residing on a second IC chip and configured to buffer the third amplified RF signal from the means for interfacing; and
first means for downconverting on the second IC chip configured to downconvert a buffered RF signal from the means for buffering on the second IC chip.

* * * * *